(12) United States Patent
Jonas

(10) Patent No.: US 12,257,707 B2
(45) Date of Patent: Mar. 25, 2025

(54) MANUFACTURING SYSTEM AND METHOD

(71) Applicant: RENISHAW PLC, Wotton-under-Edge (GB)

(72) Inventor: Kevyn Barry Jonas, Clevedon (GB)

(73) Assignee: RENISHAW PLC, Wotton-under-Edge (GB)

( * ) Notice: Subject to any disclaimer, the term of this patent is extended or adjusted under 35 U.S.C. 154(b) by 603 days.

(21) Appl. No.: 17/413,251

(22) PCT Filed: Dec. 16, 2019

(86) PCT No.: PCT/GB2019/053561
§ 371 (c)(1),
(2) Date: Jun. 11, 2021

(87) PCT Pub. No.: WO2020/128441
PCT Pub. Date: Jun. 25, 2020

(65) Prior Publication Data
US 2022/0048198 A1    Feb. 17, 2022

(30) Foreign Application Priority Data

Dec. 21, 2018   (GB) ..................................... 1820935

(51) Int. Cl.
*B25J 9/00* (2006.01)
*B25J 9/06* (2006.01)
(Continued)

(52) U.S. Cl.
CPC ............... *B25J 9/0084* (2013.01); *B25J 9/06* (2013.01); *B25J 9/1687* (2013.01); *B25J 9/1692* (2013.01);
(Continued)

(58) Field of Classification Search
CPC ........ B25J 9/003; B25J 9/0054; B25J 9/0057; B25J 9/0084; B25J 9/06; B25J 9/1687;
(Continued)

(56) References Cited

U.S. PATENT DOCUMENTS 4,976,582 A   12/1990  Clavel
5,028,180 A    7/1991  Sheldon et al.
(Continued)

FOREIGN PATENT DOCUMENTS

CN           1667362 A      9/2005
CN         101239469 A      8/2008
(Continued)

OTHER PUBLICATIONS

Mar. 17, 2020 International Search Report issued in International Patent Application No. PCT/GB2019/053561.
(Continued)

*Primary Examiner* — Joseph Brown
(74) *Attorney, Agent, or Firm* — Oliff PLC

(57) ABSTRACT

A manufacturing system includes: a coordinate positioning machine having a structure moveable within a working volume of the machine, a drive arrangement for moving the structure around the working volume, and a positioning arrangement for determining the position of the structure within the working volume with a first accuracy; and a metrology arrangement to which the machine is removably couplable, such that when the machine is coupled to the metrology arrangement, with the structure being moved by the drive arrangement, the metrology arrangement is able to measure the position of the structure with a second accuracy that is higher than the first accuracy.

27 Claims, 17 Drawing Sheets

(51) Int. Cl.
*B25J 9/16* (2006.01)
*B25J 11/00* (2006.01)
*B25J 13/08* (2006.01)
*B25J 15/00* (2006.01)
*B25J 15/04* (2006.01)

(52) U.S. Cl.
CPC ......... *B25J 11/0055* (2013.01); *B25J 13/089* (2013.01); *B25J 15/0019* (2013.01); *B25J 15/04* (2013.01)

(58) Field of Classification Search
CPC .... B25J 9/1692; B25J 11/0055; B25J 13/089; B25J 15/0019; B25J 15/04; G01B 5/008; G05B 2219/50162
See application file for complete search history.

(56) References Cited

U.S. PATENT DOCUMENTS

| | | | |
|---|---|---|---|
| 5,354,158 A | 10/1994 | Sheldon et al. | |
| 5,428,446 A * | 6/1995 | Ziegert | G01B 21/047 250/231.11 |
| 5,466,085 A | 11/1995 | Sheldon et al. | |
| 5,489,168 A | 2/1996 | Sheldon et al. | |
| 5,870,834 A * | 2/1999 | Sheldon | G01B 21/047 33/502 |
| 5,887,356 A * | 3/1999 | Sheldon | G01B 7/012 33/559 |
| 5,909,939 A * | 6/1999 | Fugmann | G01B 5/008 33/503 |
| 6,086,283 A * | 7/2000 | Ziegert | G01B 5/008 403/57 |
| 7,355,725 B2 | 4/2008 | Watanabe et al. | |
| 7,753,642 B2 | 7/2010 | Bosscher et al. | |
| 7,841,097 B2 | 11/2010 | Evans et al. | |
| 7,853,359 B2 | 12/2010 | Ban et al. | |
| 9,694,504 B2 | 7/2017 | Gratsias et al. | |
| 9,797,706 B2 | 10/2017 | Jordil et al. | |
| 10,232,511 B2 | 3/2019 | Hofmann et al. | |
| 10,816,335 B2 | 10/2020 | McMurtry et al. | |
| 10,967,502 B2 | 4/2021 | Angood | |
| 11,300,396 B2 | 4/2022 | Angood | |
| 11,300,408 B2 | 4/2022 | McMurtry et al. | |
| 2003/0005786 A1 | 1/2003 | Stuart et al. | |
| 2008/0271332 A1 | 11/2008 | Jordil et al. | |
| 2009/0066100 A1 | 3/2009 | Bosscher et al. | |
| 2009/0182454 A1 | 7/2009 | Donoso et al. | |
| 2009/0194664 A1* | 8/2009 | Evans | G01B 5/0016 248/670 |
| 2011/0056074 A1 | 3/2011 | Jonas et al. | |
| 2015/0176956 A1* | 6/2015 | Pettersson | G01B 5/008 33/503 |
| 2016/0223316 A1 | 8/2016 | Jordil et al. | |
| 2017/0326732 A1 | 11/2017 | Hofmann et al. | |
| 2018/0209788 A1 | 7/2018 | Mcmurtry et al. | |
| 2019/0072373 A1* | 3/2019 | Iseli | G01B 5/0004 |
| 2020/0262055 A1 | 8/2020 | Angood | |
| 2021/0010808 A1 | 1/2021 | Mcmurtry et al. | |
| 2021/0187729 A1 | 6/2021 | Angood | |

FOREIGN PATENT DOCUMENTS

| | | |
|---|---|---|
| CN | 108885082 A | 11/2018 |
| DE | 141061 A1 | 4/1980 |
| DE | 3504464 C1 | 4/1986 |
| DE | 102009039811 A1 | 3/2011 |
| EP | 2743040 A2 | 6/2014 |
| EP | 3054265 A1 | 8/2016 |
| GB | 2568459 A | 5/2019 |
| JP | S60-117087 U | 8/1985 |
| JP | H5-500337 A | 1/1993 |
| JP | 2005-7489 A | 1/2005 |
| JP | 2008-275624 A | 11/2008 |
| JP | 2009-540315 A | 11/2009 |
| JP | 2011-529262 A | 12/2011 |
| JP | 2013-119135 A | 6/2013 |
| JP | 2017-007082 A | 1/2017 |
| JP | 2018-522247 A | 8/2018 |
| WO | 2007/017235 A2 | 2/2007 |

OTHER PUBLICATIONS

Mar. 17, 2020 Written Opinion issued in International Patent Application No. PCT/GB2019/053561.
Jun. 5, 2019 Search Report issued in British Patent Application No. 1820935.3.
Kenneth Levenberg. "A Method for the Solution of Certain Non-Linear Problems in Least Squares". Quarterly of Applied Mathematics, vol. 2, 1944. pp. 164-168.
Donald W. Marquardt. "An Algorithm for Least-Squares Estimation on Nonlinear Parameters". SIAM Journal on Applied Mathematics, vol. 11, No. 2, 1963, pp. 431-441.
H.J.J. Braddick. "Mechanical Design of Laboratory Apparatus". Chapman & Hall, London, 1960, pp. 11-30.

* cited by examiner

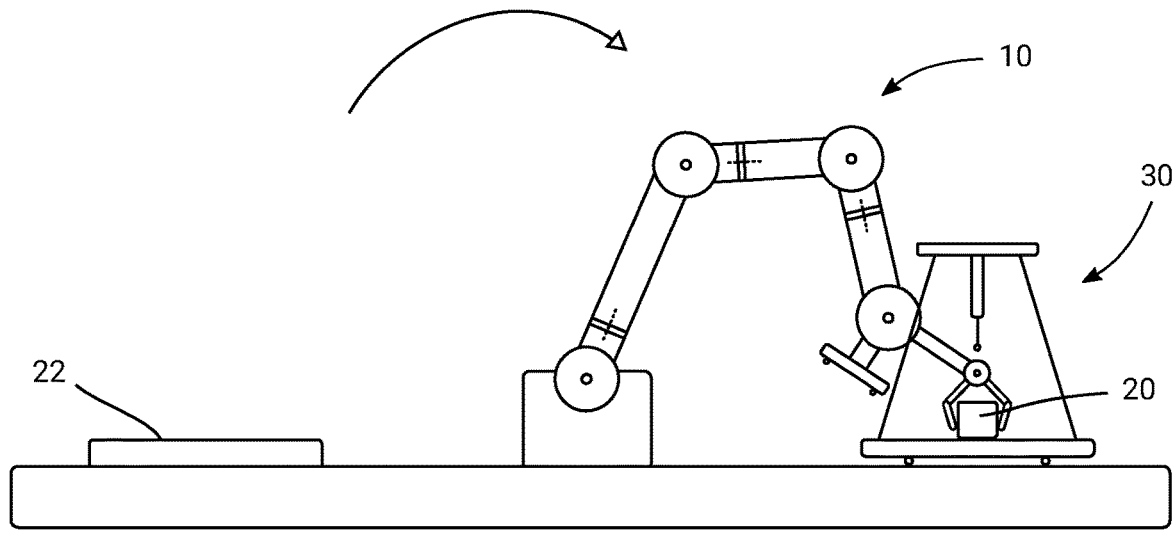
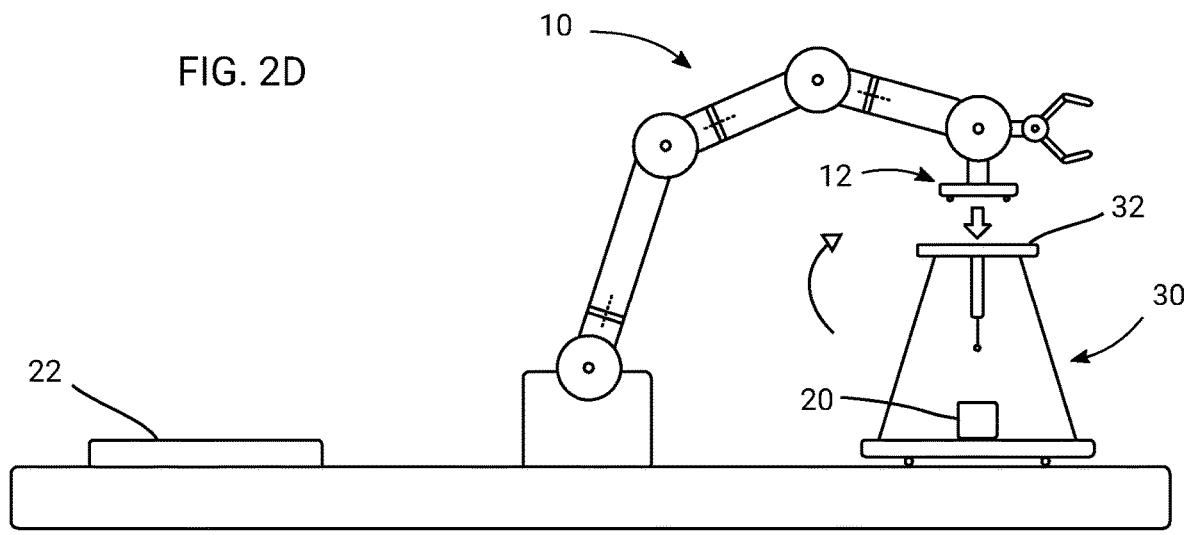

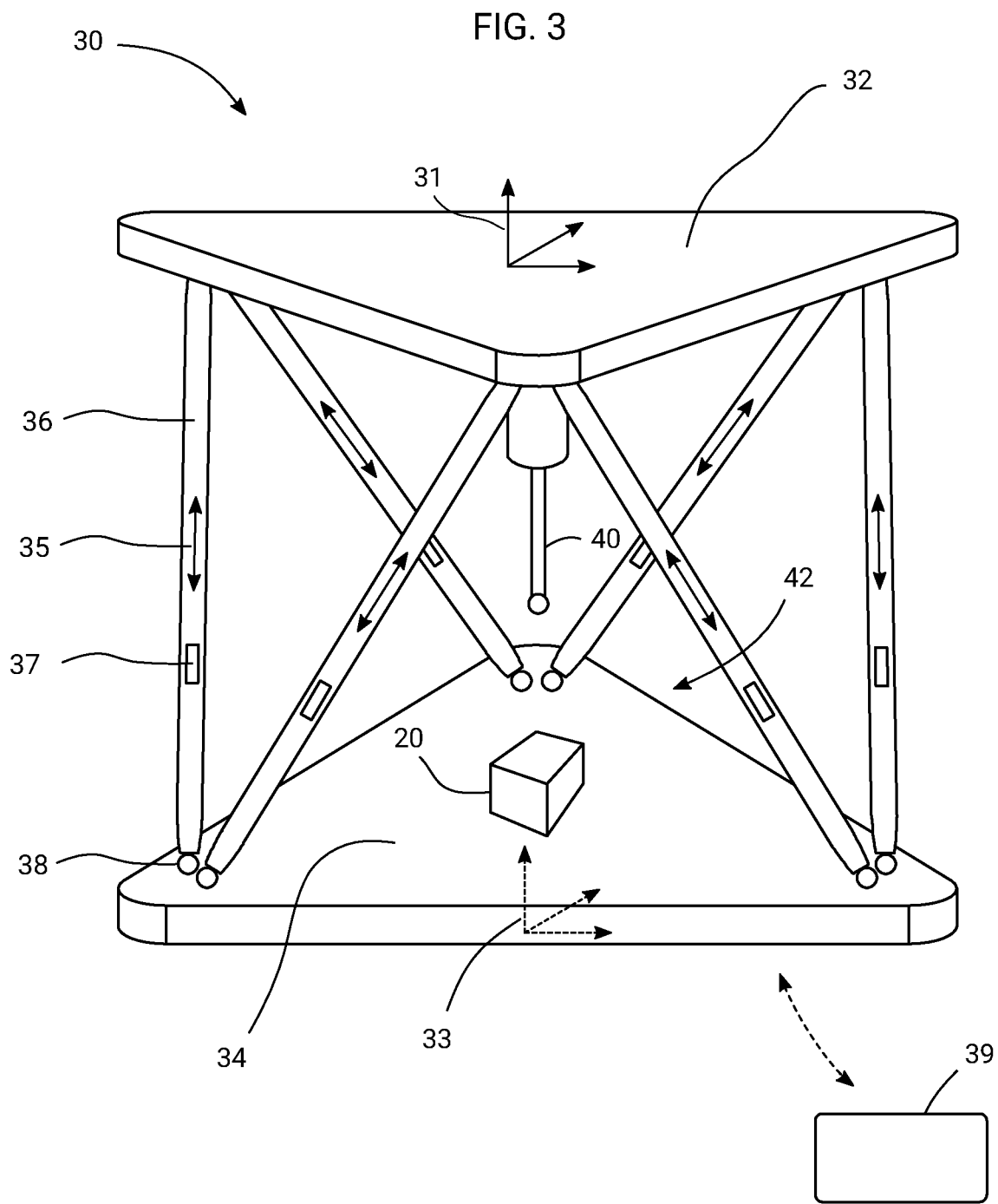

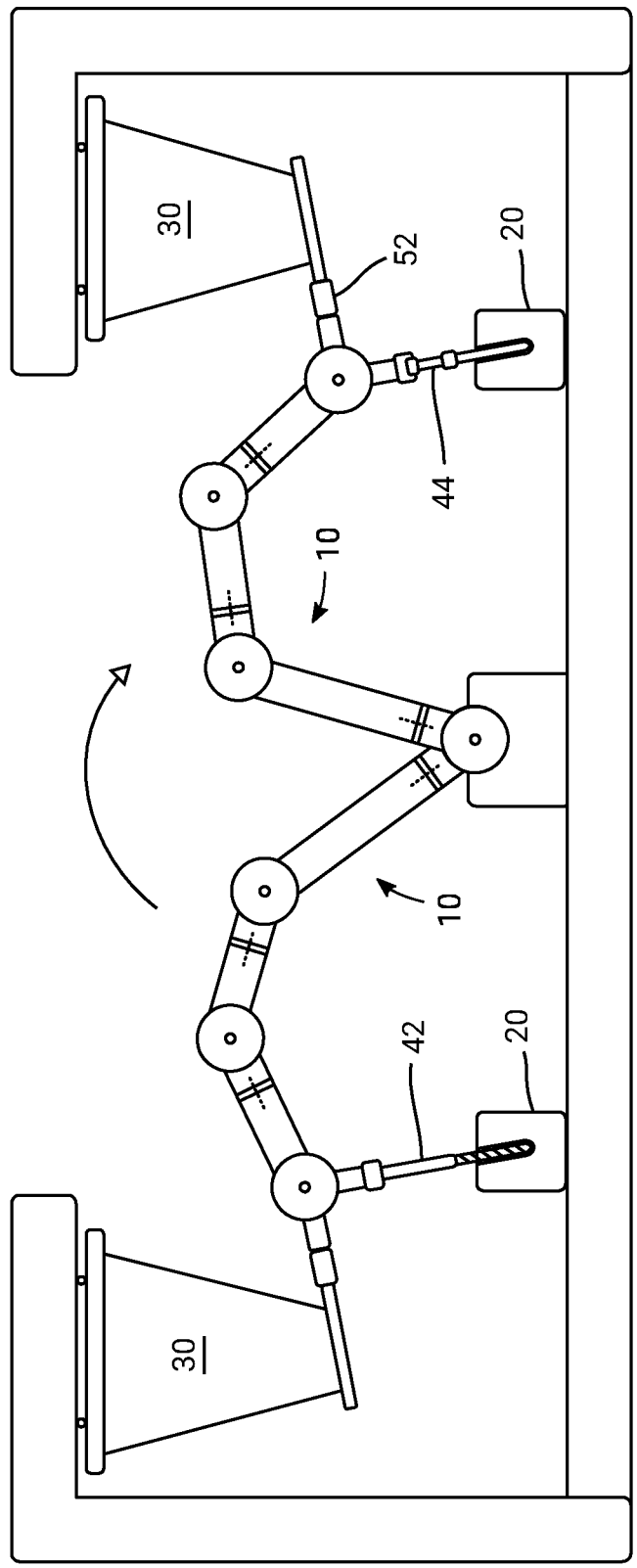

MANUFACTURING SYSTEM AND METHOD

SUMMARY

The present invention relates to a manufacturing system and a manufacturing method. The present invention relates in particular, but not exclusively, to a manufacturing system and a manufacturing method which involves the use of an articulated robot.

Articulated robots are commonly used in a wide variety of manufacturing applications such as assembly, welding, gluing, painting, picking and placing (e.g. for printed circuit boards), packaging and labelling, palletizing, and product inspection. They benefit from being versatile and rugged, with a large reach and a high degree of flexibility of movement, making them ideal for use in a production environment.

An articulated robot (or just "robot" for short) is illustrated schematically in FIG. 1 of the accompanying drawings, comprising an articulated arm 1 extending from a fixed base 2 to a moveable flange 3, with the flange 3 supporting a tool (or end effector) 4. Typically, the flange 3 is provided with a coupling which allows for the tool 4 to be conveniently interchangeable, so that a variety of tools or end effectors can be employed depending on the application concerned; examples include grippers, vacuum cups, cutting tools (including both mechanical and laser cutting tools), drilling tools, milling tools, deburring tools, welding tools and other specialized tools.

The arm 1 comprises a plurality of segments 5 connected by a plurality of rotary joints 6, forming a mechanical linkage from one end to the other. In the example illustrated in FIG. 1, there are seven rotary joints 6, which alternate between rotary joints having a rotational axis perpendicular to a longitudinal axis of its connected segments 5, and rotary joints having a rotational axis parallel to a longitudinal axis of its connected segments 5.

Perhaps the most common arrangement for an industrial robot is to have six rotary joints, though a robot may also have one or more linear joints. Having multiple joints allows for flexibility in moving the tool 4 around a working volume and manipulating it into a variety of different poses. The degree of flexibility can be altered by having more or fewer joints in the arm.

Having additional joints (and therefore additional flexibility) has a downside in that each joint contributes a positional error or uncertainty, and because of the serial nature of the linkages these errors are cumulative. It is important to calibrate the robot in order to map out these errors or uncertainties.

However, calibration of any type of non-Cartesian machine is a significant challenge, and particularly so for an articulated arm such as that illustrated in FIG. 1 having a plurality of rotary joints that are not fixed relative to one another and that can combine in complicated ways to position the tool in the working volume. Calibration of a Cartesian machine is typically more straightforward, because such a machine has three well-defined axes that are fixed relative to one another in an orthogonal arrangement, with each axis being largely independent of another. With an articulated robot, the position and orientation of each axis depends on the position and orientation of each other axis, so that the calibration will be different for each different machine pose.

Many calibration techniques have in common the goal of specifying a parametric model of the machine concerned, in which a plurality of parameters are used to characterise the machine's geometry. Uncalibrated values are initially assigned to these parameters as a starting point for the machine geometry. During the calibration, the machine is moved into a variety of different poses (based on the current estimates of the machine parameters). For each pose, a calibrated measuring device is used to measure the actual pose, so that an indication of the error between the assumed machine pose and the actual machine pose can be determined.

The task of calibrating the machine then amounts to determining a set of values for the machine various parameters that minimises the errors, using known numerical optimisation or error minimisation techniques. An example of such a technique is the well-known Levenberg-Marquardt algorithm, which uses a least-squares approach to minimise errors knowing the derivatives of the errors according to each parameter optimised ("A Method for the Solution of Certain Non-Linear Problems in Least Squares", Kenneth Levenberg, 1944, Quarterly of Applied Mathematics, 2: 164-168; and "An Algorithm for Least-Squares Estimation of Nonlinear Parameters", Donald Marquardt, 1963, SIAM Journal on Applied Mathematics, 11 (2): 431-441). Other techniques are also possible, including those based on a maximum likelihood approach.

For a robot as illustrated in FIG. 1, these machine parameters might include various geometrical parameters such as the length of each of the segments 5 and the rotation angle offset of each of the rotational joints 6 (with the angle from the encoder plus the calibrated offset giving the actual angle), as well as various mechanical parameters such as joint compliance and friction. When properly calibrated, with all of these machine parameters known, it is possible to predict with more certainty in what position the tool 4 will actually be when the various joints 6 are commanded by a robot controller 7 to move to different respective positions. In other words, the machine parameters resulting from such a calibration provide a more accurate characterisation of the machine geometry.

DE3504464C1 describes the use of a plurality of telescopic rods which are attached temporarily to an articulated robot for a calibration procedure.

However, even after calibration of such an articulated robot, errors will remain, and because of the serial nature of the mechanical linkage, these errors are cumulative. As a result, the accuracy and repeatability of an articulated robot is typically not as good as that of a traditional three-axis Cartesian machine, for example. Therefore, although articulated robots benefit greatly from a large reach and a high degree of flexibility and versatility, they are not typically suitable for use in the most demanding of applications where high accuracy and/or repeatability is required.

It is desirable to address the above-described shortcomings, to provide a system which can benefit from the reach and flexibility of an articulated robot though with an improved accuracy and/or repeatability.

According to the present invention there is provided a manufacturing system comprising: a coordinate positioning machine having a structure moveable within a working volume of the machine, a drive arrangement for moving the structure around the working volume, and a positioning arrangement for determining the position of the structure within the working volume with a first accuracy; and a metrology arrangement to which the machine is removably couplable, such that when the machine is coupled to the metrology arrangement, with the structure being moved by the drive arrangement, the metrology arrangement is able to measure the position of the structure with a second accuracy that is higher than the first accuracy.

When the machine is coupled to the metrology arrangement a predetermined zone may be defined within the working volume in which the metrology arrangement is able to measure the position of the structure with the second accuracy. There may be a plurality of such metrology arrangements around the working volume, defining a plurality of corresponding respective zones within the working volume.

The drive arrangement may comprise a plurality of segments or links connected or arranged in series by a plurality of motorised joints. The joints may comprise at least one rotational joint. The joints may comprise at least one linear joint. The joints may comprise only rotational joints.

The machine may be a robot. The machine may be a serial robot. The machine may be an industrial robot. The machine may be a robot arm. The machine may any other type of machine, such as a delta robot (U.S. Pat. No. 4,976,582) or a cable robot (US 2009/0066100) or a tri-glide arrangement (US 2003/0005786).

The positioning arrangement may comprise a plurality of measurement transducers (e.g. encoders) in a serial arrangement for providing a corresponding respective plurality of measurements from which the position of the structure is determinable with the first accuracy.

The metrology arrangement may comprise a plurality of measurement transducers (e.g. encoders) in a parallel arrangement for providing a corresponding respective plurality of measurements from which the position of the structure is determinable with the second accuracy.

The metrology arrangement may comprise six such measurement transducers.

The metrology arrangement may be a hexapod metrology arrangement.

The machine may be operable (or adapted) to perform at least one of the following types of operation with the machine also coupled to the metrology arrangement: a measurement operation, a probing operation, a machining operation, a gripping operation, a drilling operation, a painting operation, a pick and place operation, and a gluing operation.

The machine may be couplable to at least one tool with the machine also coupled to the metrology arrangement. The machine may have a coupling which enables it to be coupled both to the at least one tool and to the metrology arrangement, so that the machine is coupled to both simultaneously. The machine may be coupled to the at least one tool and to the metrology arrangement at the same time.

The tool may be for performing an operation such as a measurement operation, a probing operation (e.g. a touch trigger operation or a scanning operation, using a contact probe or a non-contact probe), a machining operation, a gripping operation, a drilling operation, a painting operation, a pick and place operation, or a gluing operation.

The at least one tool may comprise at least one of: a measurement probe, a gripper, a drilling tool, a welding tool, a gluing tool, and a painting tool. The measurement probe may be a contact probe or a non-contact (e.g. optical) probe. The measurement probe may be a touch trigger probe or a scanning probe.

It will be understood that the metrology arrangement is not for calibration purposes only. In other words, the metrology arrangement is not installed only during a setup and calibration procedure which is performed in advance of the machine being put into operational use, with the metrology arrangement then being detached from the machine. Rather, the metrology arrangement is in place during actual operational use of the machine, and effectively becomes part of the machine during operational use. In this way, the metrology arrangement can be used to provide metrology results (measurements) that relate to events (e.g. touch trigger events or pick-and-place events) that occur during operational use. This is to be contrasted with the telescopic calibration rods set out in DE3504464C1, which are for calibration purposes only.

At least one tool may be provided as an integral part of the metrology arrangement, thereby forming a "smart tool" as described in more detail below. Accordingly, the machine may be coupled to the tool by virtue of being coupled to the metrology arrangement, or vice versa, since the metrology arrangement and the tool are effectively just a single entity to which the machine is couplable. Alternatively, the tool and metrology arrangement may be provided separately, so that the machine is coupled separately to the tool and the metrology arrangement.

The coupling between the coordinate positioning machine and the metrology arrangement may be a physical and/or mechanical coupling.

The coupling between the coordinate positioning machine and the metrology arrangement may be a kinematic or pseudo-kinematic coupling.

According to another aspect of the present invention there is provided a method of controlling a manufacturing system as described above, with the method comprising: performing a first operation with the machine uncoupled from the metrology arrangement; determining the position of the structure during the first operation using the positioning arrangement of the machine; coupling the machine to the metrology arrangement; performing a second operation with the machine coupled to the metrology arrangement; measuring the position of the structure during the second operation using the metrology arrangement; and decoupling the machine from the metrology arrangement.

The first operation may be performed outside the above-mentioned zone and the second operation is performed inside the zone. The first operation may comprise moving the machine from another such zone.

The second operation may comprise at least one of: a measurement operation, a machining operation, and a gluing operation.

The method may comprise removably coupling the machine to a tool required for the second operation, for example prior to coupling to the metrology arrangement.

With the coordinate positioning machine coupled to the metrology arrangement (e.g. when performing the second operation), the positioning arrangement of the coordinate positioning machine may still be present and/or in place. The positioning arrangement of the coordinate positioning machine may still be operational during the second operation.

The coordinate positioning machine may be controlled during the second operation based on positional data from the positioning arrangement of the coordinate positioning machine.

The coordinate positioning machine may be controlled during the second operation based on positional data from the metrology arrangement (so that the metrology arrangement effectively replaces the positioning arrangement).

The coordinate positioning machine may be controlled during the second operation based on a combination of positional data from the positioning arrangement and from the metrology arrangement.

The structure may comprise one or more elements of the coordinate positioning machine, for example the final element in a serial mechanical linkage, and/or a component attached to such an element in a known relationship.

Measuring or determining the position of the structure may comprise measuring or determining the position of a component, such as a tool, attached to the structure in a known spatial relationship. Because of the known spatial relationship, determining the position of the structure effectively amounts to or is equivalent to determining (and/or may be necessary for determining) the position of the attached component or tool.

Measuring the "position" of the structure is to be understood as measuring the position and/or orientation of the structure, to the appropriate number of degrees of freedom. For example, where position is measured in six degrees of freedom then both the position and orientation of the structure are determined. However, if the position is only measured in three degrees of freedom then this may or may not include a determination of the orientation of the structure. The term "measuring the position" is to be interpreted accordingly.

The term couplable as used herein can be considered to mean removably couplable, or readily removably couplable, or readily couplable and decouplable, for example in a way in which the coordinate positioning machine can be coupled to the metrology arrangement and decoupled again from the metrology arrangement with relative ease and/or without manual (human) involvement or intervention, i.e. in an automated fashion. There is a sense that the coupled state is only intended to be a temporary state, rather than a permanent or semi-permanent state, with the coordinate positioning machine being coupled to the metrology arrangement only temporarily for a specific operation or series of operations. For this purpose, a dedicated coupling element can be provided on both the coordinate positioning machine and on the metrology arrangement, with the coupling elements being adapted so as to be engageable and disengageable with one another in an automated manner.

The position being measured before and after coupling the coordinate positioning to the metrology arrangement may have difference frames of reference. The frames of reference may be related to one another via a kinematic coupling arrangement between the coordinate positioning machine and the metrology arrangement to ensure that the relative positioning between these is accurate, known and repeatable.

The coupling may be a physical and/or mechanical coupling. This is to be contrasted with e.g. an optical tracking system where the optical tracker is permanently attached (i.e. not removably coupled in the sense intended herein) and may be switched on and off, as and when required; although such a coupling is switchable (removable) it is an optical coupling rather than a physical or mechanical coupling. Where an optical metrology arrangement is used in an embodiment of the present invention it is removably coupled to the coordinate positioning machine in a physical or mechanical manner, so that the optical metrology arrangement can selectively form part of the coordinate positioning machine, or not, as required. This is to be differentiated from merely switching an optical metrology system on or off, which is not considered to be a coupling and decoupling in the sense intended herein.

The coupling may be an automated coupling rather than a manual coupling. This enables the manufacturing process to proceed without manual intervention when coupling and uncoupling the coordinate positioning machine from the metrology arrangement. Thus, the machine can move from the lower-accuracy zone to the higher-accuracy zone, perform operations in the higher-accuracy zone, and then move from the higher-accuracy zone back to the lower-accuracy zone to perform further operations, all without manual intervention. An automated coupling is to be contrasted with a coupling that requires manual attachment of the metrology arrangement to the coordinate positioning machine.

The manufacturing system as set out above may comprise a machine controller that is operable (or adapted) to perform the above-mentioned control method.

According to another aspect of the present invention the second accuracy is different from but not necessarily lower than the first accuracy. The metrology arrangement is a positioning arrangement for measuring the position of the structure with the second accuracy.

According to another aspect of the present invention, there is provided a computer program which, when run by a computer or a machine controller, causes the computer or machine controller to perform the above-described method according to the present invention. The program may be carried on a carrier medium. The carrier medium may be a storage medium. The carrier medium may be a transmission medium.

According to another aspect of the present invention, there is provided a computer-readable medium having stored therein computer program instructions for controlling a computer or machine controller to perform the above-described method according to the present invention.

Reference will now be made, by way of example, to the accompanying drawings, in which:

BRIEF DESCRIPTION OF THE DRAWINGS

FIGS. 2A to 2J shows a manufacturing system and various stages of a manufacturing method according to an embodiment of the present invention;

FIG. 3 shows the hexapod metrology arrangement of FIGS. 2A to 2J in more detail;

FIGS. 8B and 8C show two alternative manufacturing systems embodying the present invention for performing equivalent operations to those of FIG. 8A;

DETAILED DESCRIPTION OF EMBODIMENTS

A manufacturing system and method according to a first embodiment of the present invention will now be described with reference to FIGS. 2A to 2J. The manufacturing system may form part of a wider production environment (e.g. factory), with other machines and workstations not shown in FIG. 2A, and the manufacturing method described may form part of a wider production process for working on a workpiece 20.

Figure 1:
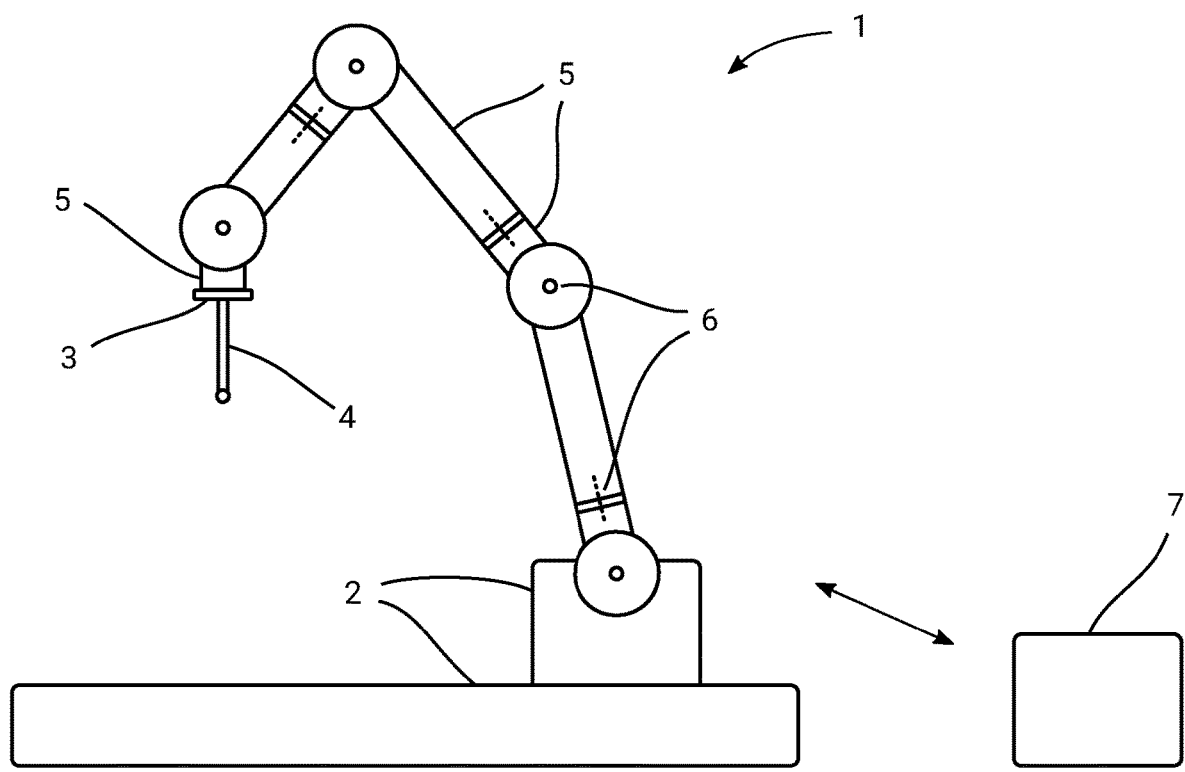
FIG. 1, discussed hereinbefore, is a schematic illustration of an articulated robot.
Figure 2A:
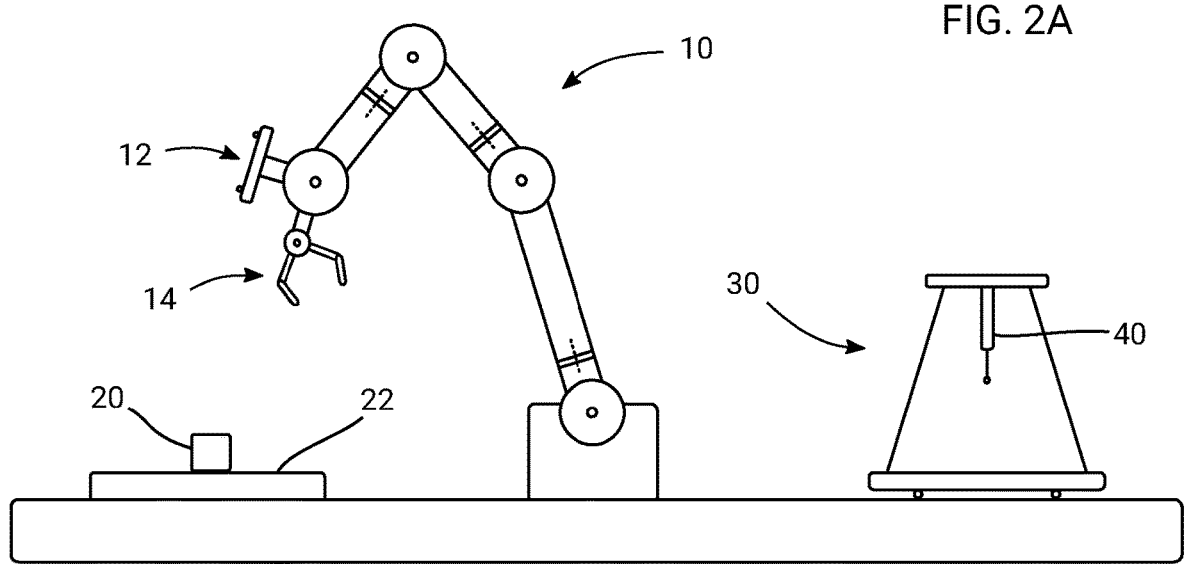

The manufacturing system comprises an articulated robot 10 which is generally similar to that described above with reference to FIG. 1. The robot 10 of FIG. 2A differs from that of FIG. 1 in the tools coupled to the final segment 5 (the flange 3 of FIG. 1 is not present in the illustrated robot 10, but one could be provided in practice). Because of the adaptability of robots, it is common for different types of tool to be coupled to the robot, or even multiple tools as is illustrated in FIG. 2A. Therefore, instead of the tool 4 shown in FIG. 1, the robot 10 of FIG. 2A is provided with a gripper 14 and a coupling element 12. The purpose of the coupling element 12 will become apparent further below, but the gripper 14 is provided for picking up and carrying the workpiece 20, which is supported on a support 22. As part of the wider production process, the workpiece 20 may have been carried to the position shown in FIG. 2A by a conveyor belt (so that the support 22 is a conveyor belt), having been worked on (e.g. machined) at another workstation or in another work area of the production environment. Or, the robot 10 could itself have previously worked on the workpiece 20 in situ, for example using a different tool to those shown in FIG. 2A, with the support 22 being a fixed worktable. The concept of interchangeable tools is explored further below with reference to FIG. 9.

In the present example, the workpiece 20 has reached a stage in the production process where it needs to be measured to check it against acceptable tolerances, or in other words to check that it has the correct and expected dimensions. As mentioned above, although an industrial robot is very versatile, it typically suffers from relatively low positioning accuracy, at least compared to more traditional coordinate measuring machines, which makes it unsuitable for carrying out a high-accuracy measurement operation as is required in the present example.

Rather than move the workpiece 20 to a completely independent coordinate measuring machine to carry out the high-accuracy measurement now required at this stage of the production process, which is what might typically happen, the present applicant has instead devised an approach that combines the versatility of a standard industrial robot with the high accuracy of a more traditional coordinate measuring machine.

Figure 2B:
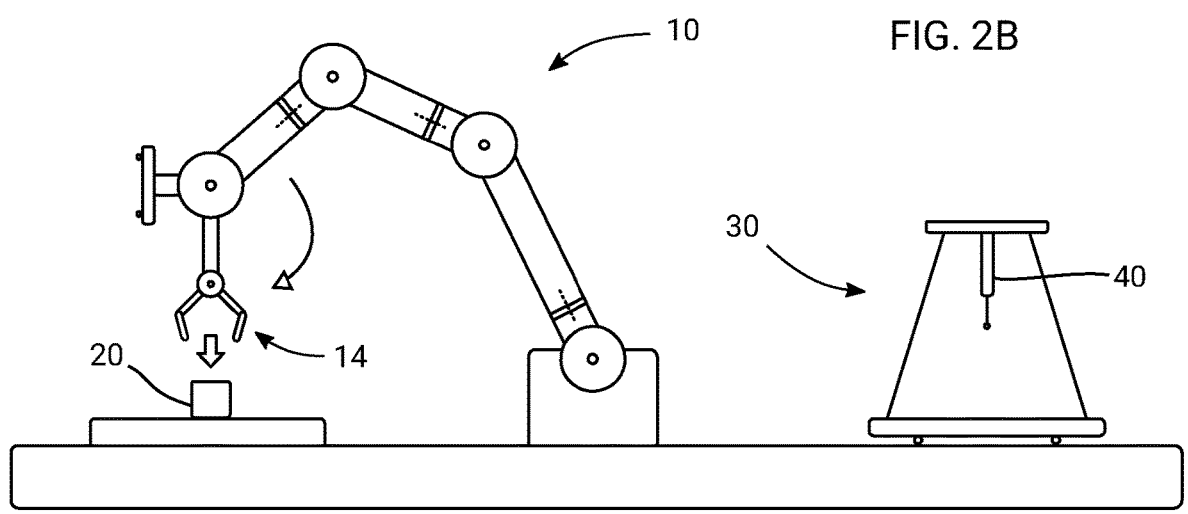

With the above in mind, and referring to FIG. 2B, the robot 10 is controlled so as to position the gripper 14 over the workpiece 20. The gripper 14, which in this example is itself articulated and extendible to some degree, is then controlled to grip and pick up the workpiece 20. Then, as illustrated in FIG. 2C, with the workpiece 20 being carried by the gripper 14, the robot 10 and gripper 14 are controlled to move the workpiece 20 across to a metrology arrangement 30 and to place the workpiece 20 within the working volume of the metrology arrangement 30.

Before describing the next step with reference to FIG. 2D, the metrology arrangement 30 will first be described in more detail with reference to FIG. 3. The metrology arrangement 30 generally comprises first and second structures 32, 34 that are supported and moved relative to each other by a plurality of telescopic or extendable legs 36 provided between them. The first and second structures 32, 34 are sometimes referred to as platforms or stages, and the extendable legs 36 are sometimes referred to as struts. Since there are six such extendable legs 36, the arrangement is commonly referred to as a hexapod, so that the metrology arrangement 30 can be referred to as a hexapod metrology arrangement 30.

The extendable legs 36 are typically mounted on the structures 32, 34 via ball joints 38, with each leg 36 either having its own ball joint 38 at one or both ends thereof (as illustrated in FIG. 3) or sharing a ball joint 38 with an adjacent leg 36 at one or both ends. Each extendible leg 36 is typically formed as a pair of tubes, with one tube being slidable within the other in order to enable extension and retraction of the extendible leg 36, as indicated by arrows 35.

The first structure 32 is moveable relative to the second structure 34 as illustrated in FIG. 3 by arrows 31, with the relative position at any instant between the first and second structures 32, 34 being monitored by a plurality of length-measuring transducers 37, for example with one transducer 37 being associated with each extendable leg 36. Each length-measuring transducer 37 may comprise an encoder scale paired with a readhead, with the encoder scale being mounted suitably to one of the pair of telescopic tubes and the readhead mounted suitably on the other. Extension of the leg 36 thus causes the encoder scale to move past the readhead thereby generating a signal based on the amount of extension.

Signals or readings from each transducer 37 are fed to a computer controller 39, which in turn is operable to compute the relative position between the first and second structures 32, 34 based on these signals or readings. By having six such length-measuring transducers 37, the relative position can be measured in six corresponding respective degrees of freedom (three translational degrees of freedom and three rotational degrees of freedom).

In the arrangement illustrated in FIG. 3, the structure 34 is provided as part of a fixed structure of the machine, with the other structure 32 moving 31 relative to the fixed structure. A measurement probe 40 can be mounted on the upper (moving) structure 32 and a workpiece 20 mounted on the lower (fixed) structure 34 to enable a measuring or probing operation to be performed on the workpiece 20. A working volume 41 is defined between the upper structure 32 and the lower structure 34 when at their most spaced-apart positions, with the tool 40 moving within in the working volume 41. Although arrows 31 are shown to indicate translational movement, the structure 32 could also be rotated. In an alternative arrangement, the upper structure 32 could be fixed and the lower structure 34 moveable (indicated by arrows 33), with the probe 40 mounted to a lower surface of the lower structure 34 and a workpiece mounted to a part of the fixed structure below that, so that the working volume 41 (or operating volume) of the machine is below the lower structure 34 rather than above it.

However, rather considering than the working volume of the metrology arrangement 30 per se, it is perhaps more appropriate to consider the working volume of the robot 10 when coupled to the metrology arrangement 30. This is because the robot 10 is still the working machine; the metrology arrangement 30 is not an independent machine in its own right, mainly because it only has measuring means (i.e. the plurality of length-measuring transducers 37) and does not have independent drive means.

Because the metrology arrangement 30 is passive, without any drive components which add weight and generate heat, metrology errors caused by inertial and thermal distortion of parts (including the measurement scale used to measure distance) can be controlled and reduced. Furthermore, because the metrology arrangement 30 does not require any drive components it can be provided with low-friction joints, whereas drive arrangements typically require more robust and substantial joints that inevitably have a higher degree of friction, particularly when under load. Therefore, the joints of the metrology arrangement 30 can be of a low-friction type and will also not be under the same loads as would be the case when combined with a drive arrangement. Hysteresis effects, which can lead to different measurements being recorded depending on the direction in which the workpiece is approached, can accordingly be reduced by having a dedicated the metrology arrangement 30 without any drive components. By being dedicated to metrology, the metrology arrangement 30 can therefore provide very high accuracy position measurements, and can be used to selectively transform a machine (e.g. robot 10) having a relatively poor accuracy into a machine having a relatively high accuracy.

Not only is it the case that the metrology arrangement 30 cannot be considered to be an independent machine in its own right because it does not have any drive means, it is also the case that the robot 10 can still perform as a standalone and working coordinate positioning machine, even without the metrology arrangement 30, because it has its own drive means and also has its own positioning means for determining the position of the working tool, using the outputs from rotary encoders associated with the various rotary joints 6 explained with reference to FIG. 1.

Thus, with an embodiment of the present invention, the robot 10 is still the machine but it couples when required to the metrology arrangement 30, i.e. when higher accuracy is required. In the embodiment being described with reference to FIGS. 2 and 3, because the hexapod metrology arrangement 30 has a more limited range or working volume than the robot 10, when the robot 10 is coupled to the metrology arrangement 30 the working volume of the combined arrangement (robot 10 plus metrology arrangement 30) is now limited by the more restricted range of movement of the metrology arrangement 30, and this creates what can be considered to be high-accuracy "zones" within the overall working volume of the robot 10 itself.

Figure 4A:
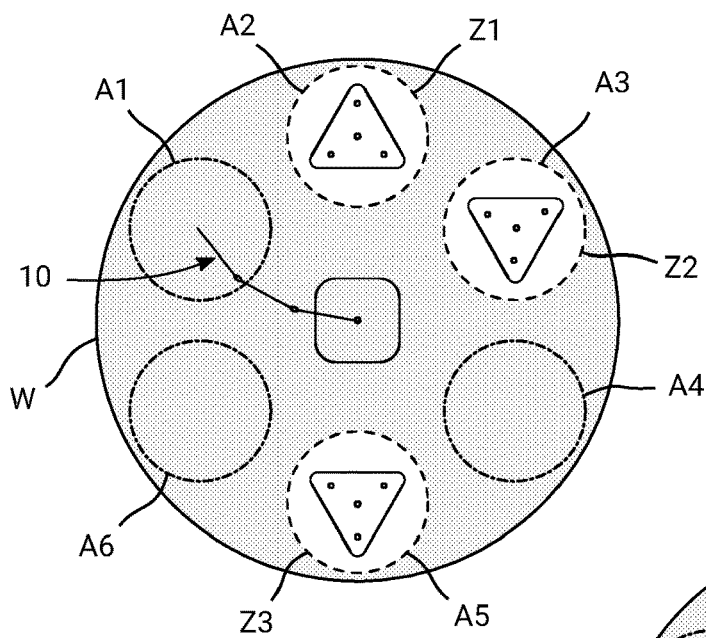
FIGS. 4A to 4D illustrate a "zone" concept according to an embodiment of the present invention.

This concept of "zones" will now be described with reference to FIGS. 4A to 4D. FIG. 4A is a schematic illustration of the robot 10 having a working volume W which encompasses a plurality of different work areas A1 to A6. A working volume can also be referred to as a working range and a work area can be referred to alternatively as a station or workstation. The intention is that a different task is performed by the robot 10 in each of the different work areas A1 to A6, for example drilling, welding, assembling, cleaning and so on. In the position shown in FIG. 4A, the robot 10 is performing operations in work area A1, which is equivalent to what is shown in FIGS. 2A and 2B, where positioning of the robot 10 is still based on the robot's own measurement transducers (positioning arrangement), i.e. with a relatively low accuracy. This is the case throughout the shaded area of FIG. 4A.

Figure 4B:
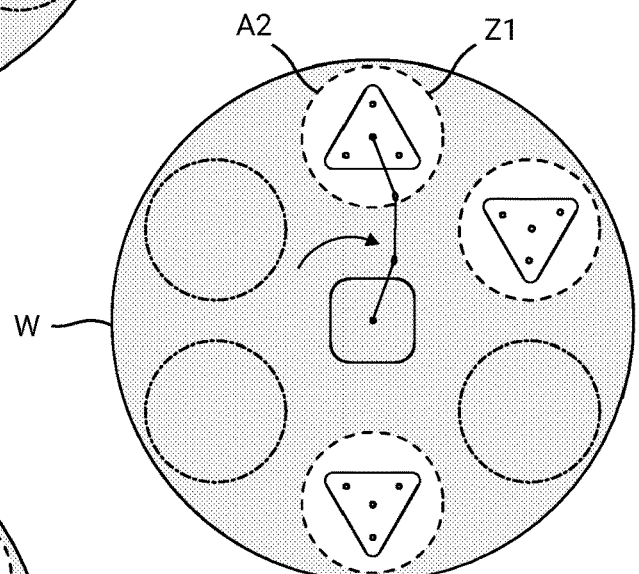
Figure 4C:
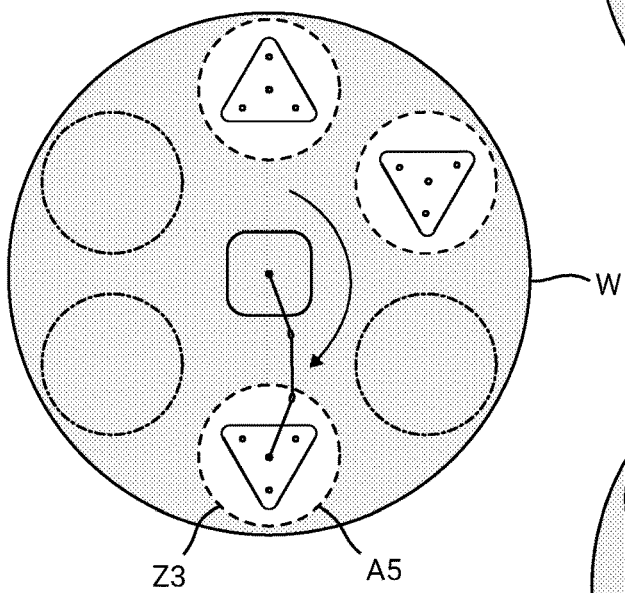
Figure 4D:
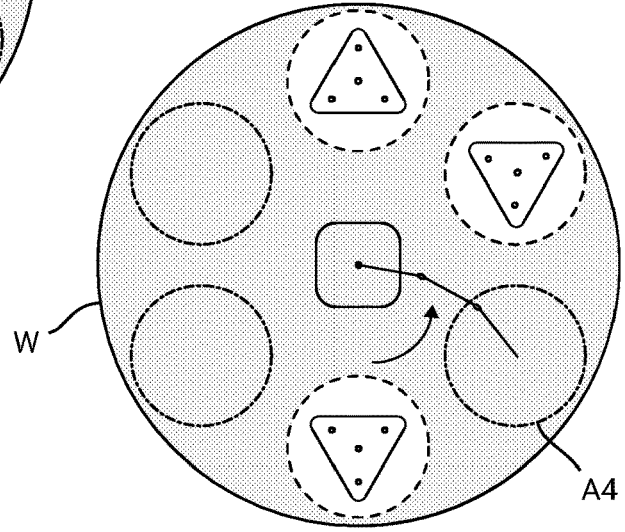

When higher-accuracy operations are required, as shown in FIG. 4B the robot 10 moves over to work area A2, which provides a high-accuracy zone Z1 within the working volume W of the robot 10. The manner in which the transition is made from the low-accuracy working volume W to the high-accuracy zone Z1 is described in more detail below. Subsequently, as shown in FIG. 4C, the robot 10 moves across to work area A5, which provides another high-accuracy zone Z3 within the working volume W of the robot 10. Then, as shown in FIG. 4D, the robot 10 moves across to work area A4, which is outside of any of the high-accuracy zones Z1 to Z3 and therefore within the low-accuracy working volume W of the robot 10.

Returning now to the steps of FIGS. 2A to 2J, it was described above with reference to FIGS. 2A to 2C how the robot 10 moves the workpiece 20 from its position shown in FIG. 2A (equivalent to station A1 in FIG. 4A) over to the metrology arrangement 30, with the gripper 14 being commanded to release the workpiece 20 such that it is placed within the metrology arrangement 30 as shown in FIG. 2C (equivalent to station A2 or zone Z1 of FIG. 4B). It is noted that the robot 10 and gripper 14 are controlled by a controller (not shown for clarity) that is equivalent to the controller 7 of FIG. 1.

Figure 2E:
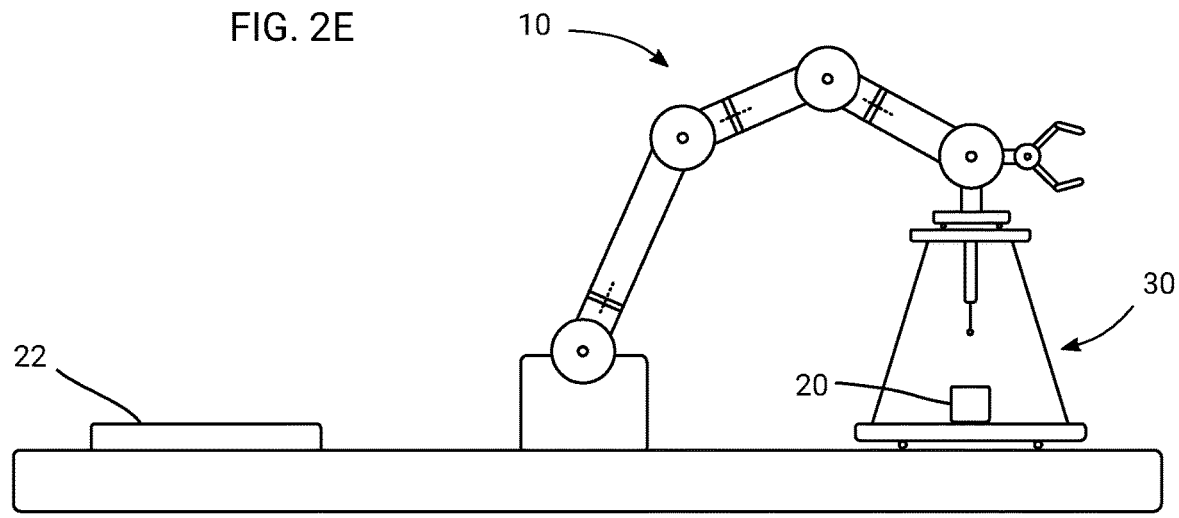

As shown in FIG. 2D, the robot 10 is then controlled to move up and around the top platform 32 of the metrology arrangement 30, and to position the coupling element 12 over the top platform 32 and subsequently down to engage with and couple to the top platform 32. FIG. 2E shows the coupling element 12 of the robot 10 having coupled to the top platform 32 of the metrology arrangement 30, with the gripper 14 now out of the way.

Figure 2F:
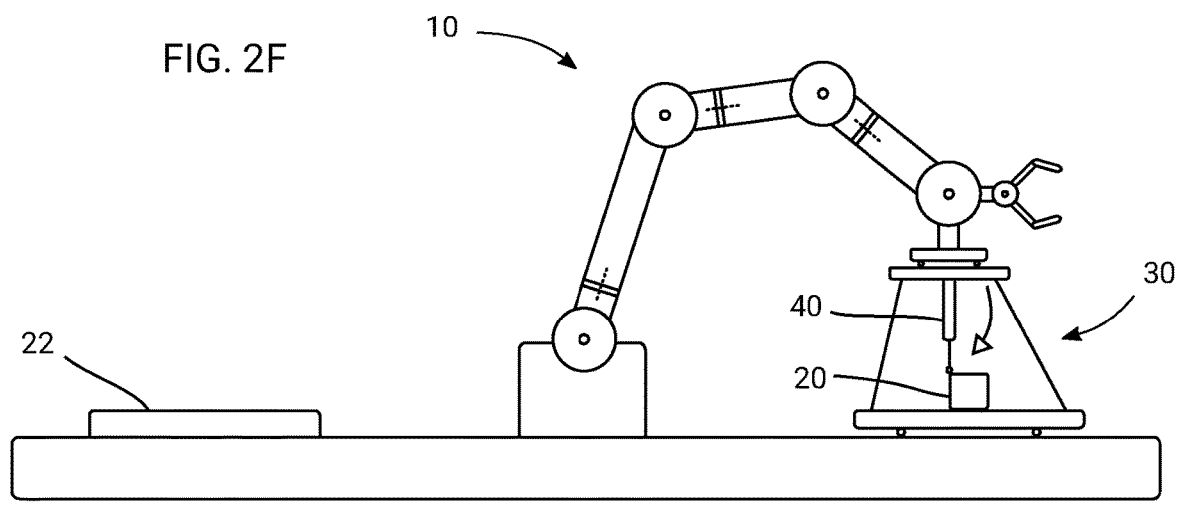
Figure 2G:
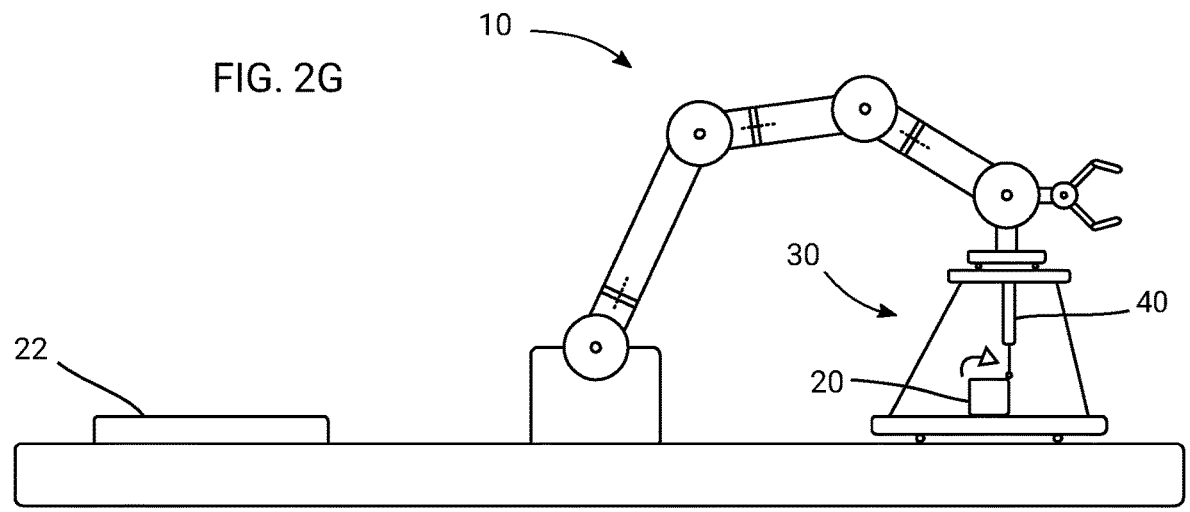

With the robot 10 now coupled to the metrology arrangement 30, a measurement operation is performed as shown in FIGS. 2F and 2G, with the robot 10 moving the measurement probe 40 into touching engagement with a first feature (corner) of the workpiece 20 in FIG. 2F and then into touching engagement with a second feature (corner) of the workpiece 20 in FIG. 2G. When a touch is made, as is well known, the deflectable stylus of the measurement probe 40 deflects and a touch trigger event is generated so that the position of the measurement probe 40 (and hence the touch point) can be recorded.

When coupled to the metrology arrangement 30 in this way, the robot 10 is being driven by its own drive means and its position is being controlled based on feedback from its own positioning arrangement (i.e. rotary encoders), but with the metrology arrangement 30 also being in place it is now possible to determine the position of the touch trigger events illustrated in FIGS. 2F and 2G more precisely, based on signals from the measurement transducers 37 of the metrology arrangement 30.

The measurement operation can include taking touch trigger measurements, where the measurement probe 40 is touched against the surface of the workpiece 20 and moved away, and then touched again in a different place, and so on, with the respective positions of the touch trigger events being recorded. The measurement operation can also include a scanning operation in which the measurement probe 40 is held in contact with the surface of the workpiece 20 whilst being scanned along the surface. Or, with a suitable type of measurement probe 40, a combination of these is also possible.

Figure 2H:
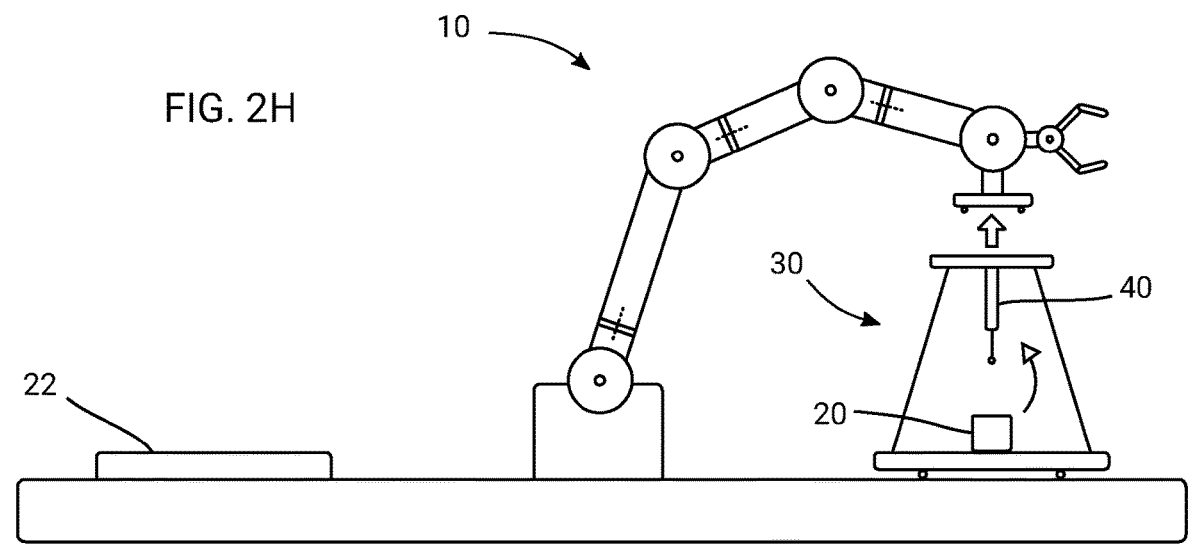
Figure 2I:
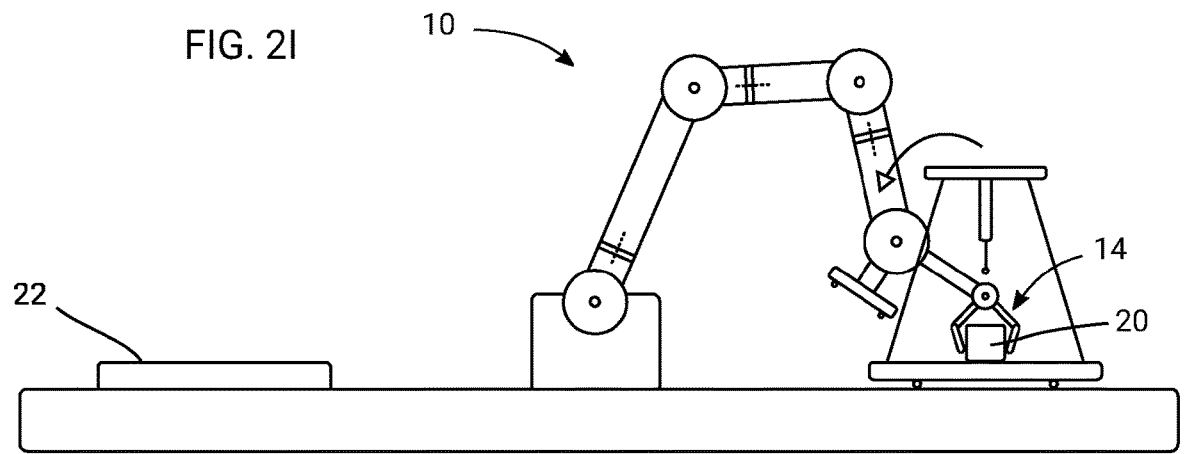
Figure 2J:
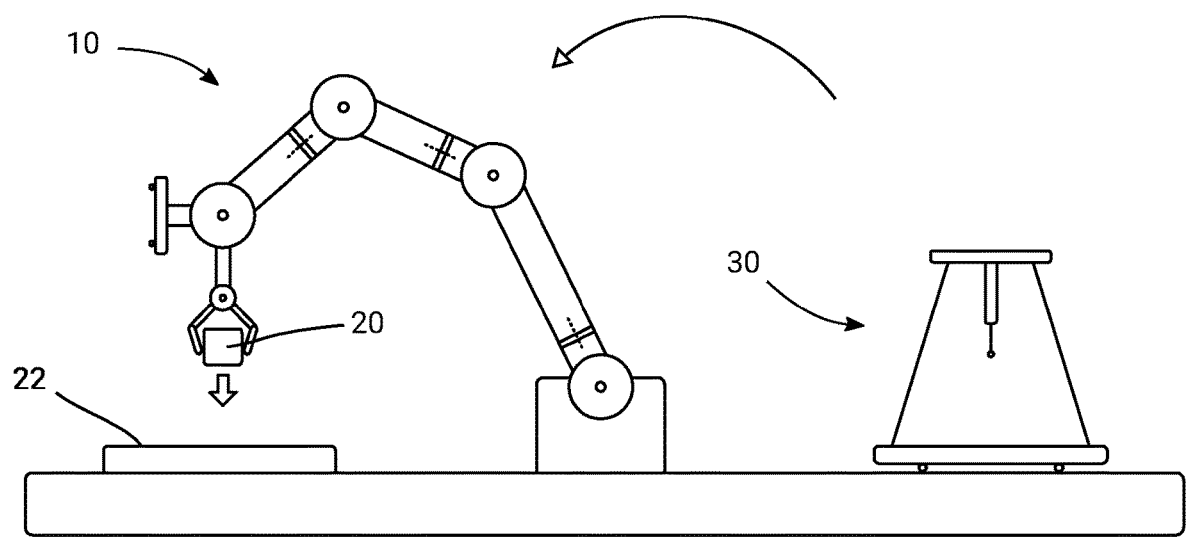

When the measurement operation has been completed, the measurement probe 40 is moved away from the workpiece 20 and the coupling element 12 is disengaged or decoupled from the top platform 32 of the metrology arrangement 30, as illustrated in FIG. 2H. Then as shown in FIG. 2I the gripper is once again employed to pick up the workpiece 20 and the workpiece 20 is moved back over to its original work area as shown in FIG. 2J (which is equivalent to work area A1 of FIG. 4A). After decoupling from the metrology arrangement 30 in FIG. 2H, the robot 10 is once again operating within its normal (low accuracy) working volume, outside of the high-accuracy zone Z1 as defined by the metrology arrangement 30.

The coupling between the coupling element 12 and the structure 32 is preferably in the form of a kinematic or pseudo-kinematic coupling. In the context of locating a body relative to another, kinematic design considerations are met by constraining the degrees of freedom of motion of the body using the minimum number of constraints, and in particular involves avoiding over constraining. Over constraining can result in multiple points of contact between two bodies enabling one body to rest in more than one position against the other. Accordingly, the body's location is not repeatable as it is not known at which of the several positions the body will come to rest. In particular, where there is over constraint, there is a conflict between the constraints that are in place, so that it is not possible to determine with any certainty which combination of constraints will determine the actual position of the body. These concepts are described in H. J. J. Braddick, "Mechanical Design of Laboratory Apparatus", Chapman & Hall, London, 1960, pages 11-30.

The use of a kinematic coupling is beneficial because it provides a very accurate and repeatable coupling, so that the location of one half of the coupling (the coupling element 12) relative to the other half of the coupling (the structure 32) is known with a high degree of certainty, for each of a plurality of separate and independent couplings (associated with a corresponding plurality of work stages) as might be performed in a typical manufacturing method. This helps to tie or relate the frame of reference of the coordinate positioning to that of the metrology arrangement, thereby effectively creating a common overall frame of reference for the machine in the coupled state.

Such a kinematic coupling, with the minimum number of contact points (or point-like contacts) to provide ideal constraint, is also very effective at isolating distortions in one half of the coupling being transferred to the other half of the coupling. Thus, the coupling helps to prevent distortions of the coupling element 12 being transferred to the structure 32 (and thereby to the metrology arrangement 30). This provides a clearly-delineated metrology frame that has a good degree of mechanical isolation from the robot 10.

In particular, in this embodiment the coupling element 12 comprises a set of three balls to provide three points of contact according to kinematic design principles (only two are shown in the schematic illustrations). The upper surface of the structure 32 can conveniently be provided with a corresponding set of grooves into which the balls will locate when coupled, again according to kinematic design principles, to provide six points of contact to constrain the coupling element 12 relative to the structure 32 in six degrees of freedom. Or, the balls could instead be provided on the structure 32 and the grooves on the coupling element 12. Reference is made to the Braddick document mentioned above for more information on this.

A pseudo-kinematic coupling could instead be provided in the form of a plurality of resilient spacers or pads instead of rigid balls, e.g. three such spacers arranged at the corners of a triangle. This provides some degree of kinematic coupling, even if the contact is not point-like but instead spread over the small area of the resilient spacer. Use of resilient spacers (e.g. made of rubber) is beneficial since they act to absorb some vibration from the drive arrangement of the robot 10 so that it is not transferred to the metrology arrangement 30. Or, the three rigid balls on one half of the coupling could interface with a flat surface on the other half (rather than grooves), or with three corresponding cup-like recesses.

By way of summary, a manufacturing system embodying the present invention as described above comprises a coordinate positioning machine (e.g. the robot 10) having a structure (e.g. the final segment of the robot to which the coupling element 12 and gripper 14 are attached in a known relationship, or either or both of the coupling element 12 and gripper 14). The structure is moveable within a working volume of the machine (e.g. working volume W shown in FIG. 4). The coordinate positioning machine has its own drive arrangement (e.g. the motors associated with rotary joints 6 of FIG. 1) for moving the structure around the working volume, and a positioning arrangement (e.g. the rotary encoders associated with rotary joints 6 of FIG. 1 and associated processing means) for determining the position of the structure within the working volume with a first (relatively low) accuracy. Separately, the manufacturing system has a metrology arrangement (e.g. the hexapod metrology arrangement 30) to which the coordinate positioning machine is couplable when required (e.g. by engaging the coupling element 12 with the platform 32), such that when the machine is coupled to the metrology arrangement, with the structure being moved by the drive arrangement, a predetermined (relatively high-accuracy) zone is defined within the working volume in which the metrology arrangement is able to measure the position of the structure with a second accuracy that is higher than the first accuracy. It is to be understood that the position of the structure is either measured directly or indirectly; for example the user is more interested in the position of the tool 4 or measurement probe 40 than of the structure to which those are attached, but the tool 4 and measurement probe 40 are attached to the structure in a known relationship, so determining the position of the tool 4 or measurement probe 40 effectively involves at least implicitly determining the position of the structure to which it is attached.

With such a manufacturing system, a manufacturing method can be carried out in which a first operation is performed outside the predetermined (relatively high-accuracy) zone, with the machine uncoupled from the metrology arrangement, and with the position of the structure during the first operation (and hence any component such as a gripper coupled in a known relationship to the structure) being determined using the positioning arrangement of the machine. The machine is then coupled to the metrology arrangement and a second operation is performed inside the zone, with the machine coupled to the metrology arrangement. The position of the structure during the second operation (and hence any component such as a measurement probe coupled in a known relationship to the structure) is determined using the metrology arrangement. Subsequently, the machine is decoupled from the metrology arrangement so that it is operating back within the wider (lower-accuracy) working volume again.

Figure 5A:
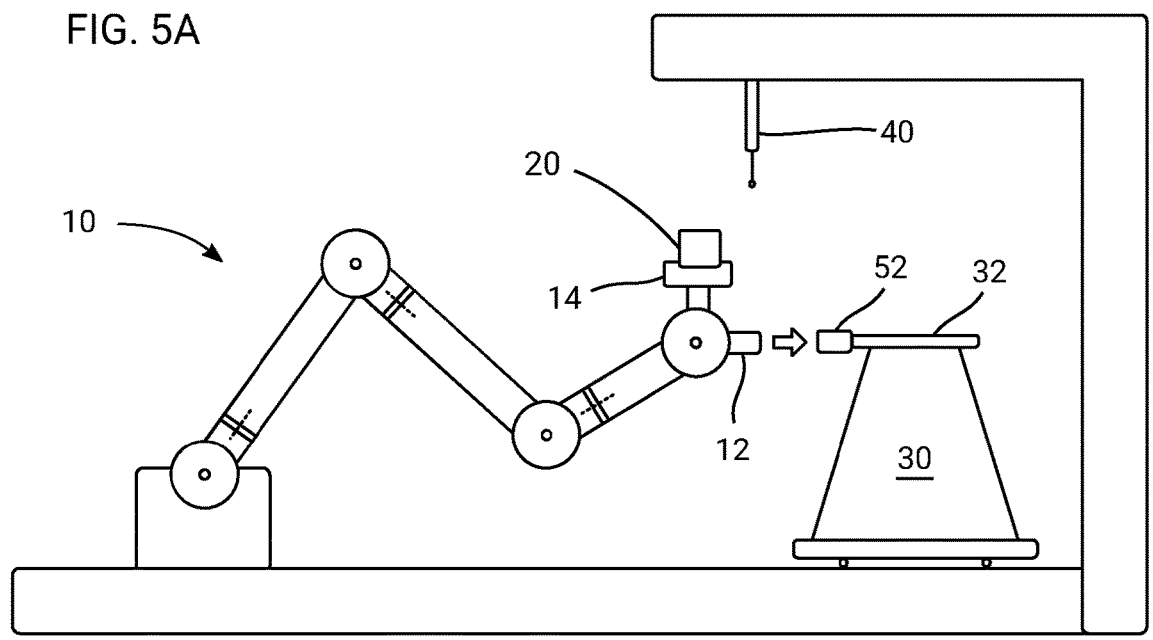
FIG. 5A illustrates a manufacturing system according to another embodiment of the present invention.

FIG. 5A is a schematic illustration of a manufacturing system according to another embodiment of the present invention. The manufacturing system again comprises an articulated robot 10 which is generally similar to that of the previous embodiment described with reference to FIG. 2, differing in that the coupling element 12 and gripper 14 of FIG. 5A are provided in a different form to the equivalent parts of FIG. 2, with the main difference being the form of coupling element 12 and how it couples to the structure 32 of the metrology arrangement 30.

Figure 5B:
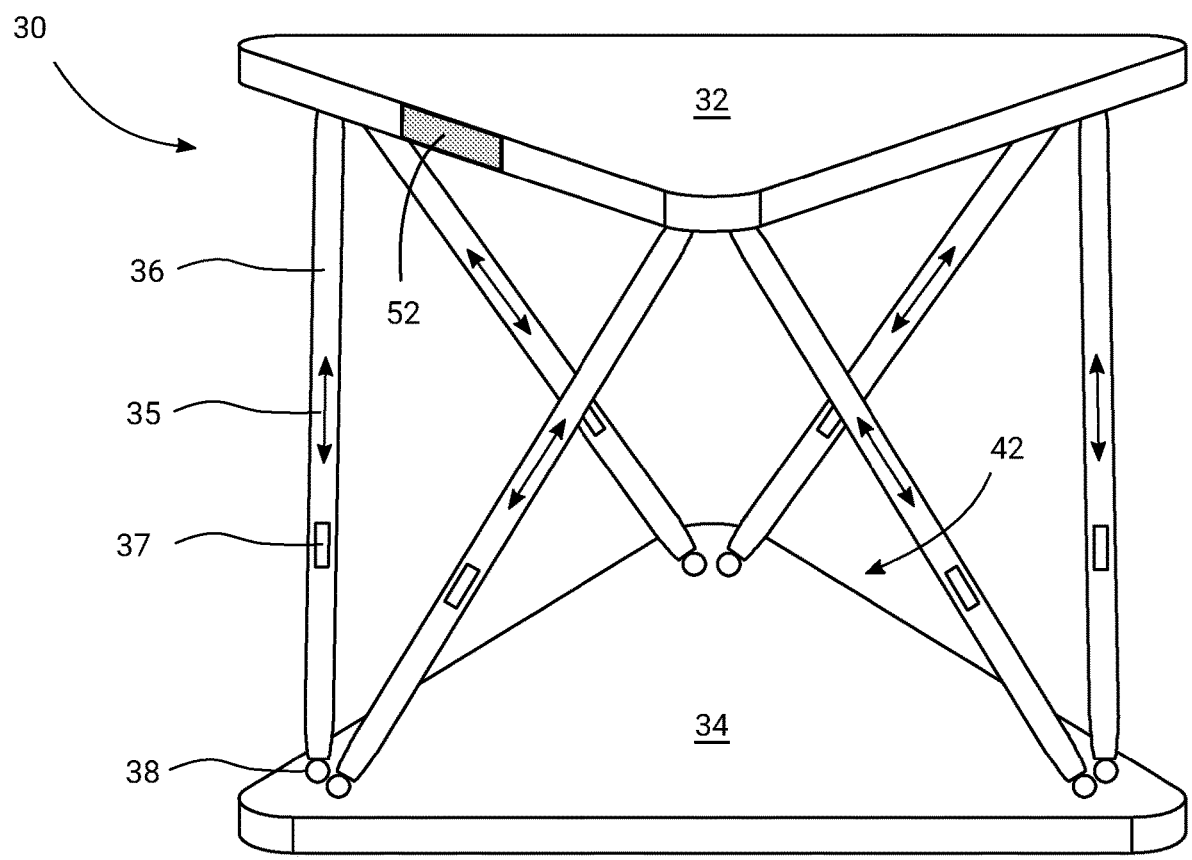
FIG. 5B shows the hexapod metrology arrangement of FIG. 5A in more detail.

The metrology arrangement 30 of FIG. 5A is shown in more detail in FIG. 5B, and is similar to that of FIGS. 2 and 3. The metrology arrangement 30 of FIGS. 5A and 5B differs in that a coupling element 52 is provided on the structure 32 (this is shown only schematically in FIG. 5B, though in practice there need not be an actual block feature as shown in FIG. 5A, with the coupling element 12 e.g. docking directly in some suitable way with the structure 32). In addition, the metrology arrangement 30 of FIGS. 5A and 5B is not provided with an integral measurement probe 40. In the manufacturing system of this embodiment, the measurement probe 40 is provided as a fixed probe attached to a fixed part of the machine (in this example on the underside of a fixed overhang), outside of the working volume of the metrology arrangement 30, rather than being supported on the underside of the platform 32 of the metrology arrangement 30 (within its working volume) as it was in FIG. 2. This emphasises what was stated above, which is that it is appropriate to define or consider the working volume of the robot 10 when coupled to the metrology arrangement 30, rather than the working volume of the metrology arrangement 30 per se. With the embodiment of FIG. 5 it is particularly apparent that the metrology arrangement 30 provides a dockable high-accuracy metrology frame for the robot 10, and not a tool (e.g. measurement probe) as well, and with the robot 10 being otherwise unchanged (i.e. retaining its normal drive arrangement and position-determining arrangement). In doing so, a high-accuracy zone is again defined within the overall working volume of the robot 10.

As will be readily apparent from the schematic illustration of FIG. 5, in order to engage or enter the high-accuracy zone, in this embodiment the coupling element 12 of the robot 10 temporarily couples to the coupling element 52 provided on the structure 32 of the metrology arrangement 30. When so coupled, the position of the workpiece 20 when it touches against the measurement probe 40 can be measured to a high accuracy based on the output from the metrology arrangement 30. When the measurement operation is complete, the robot 10 can again decouple or disengage from the metrology arrangement 30, returning to a lower-accuracy regime and ready to perform other tasks around its working volume.

Figure 6:
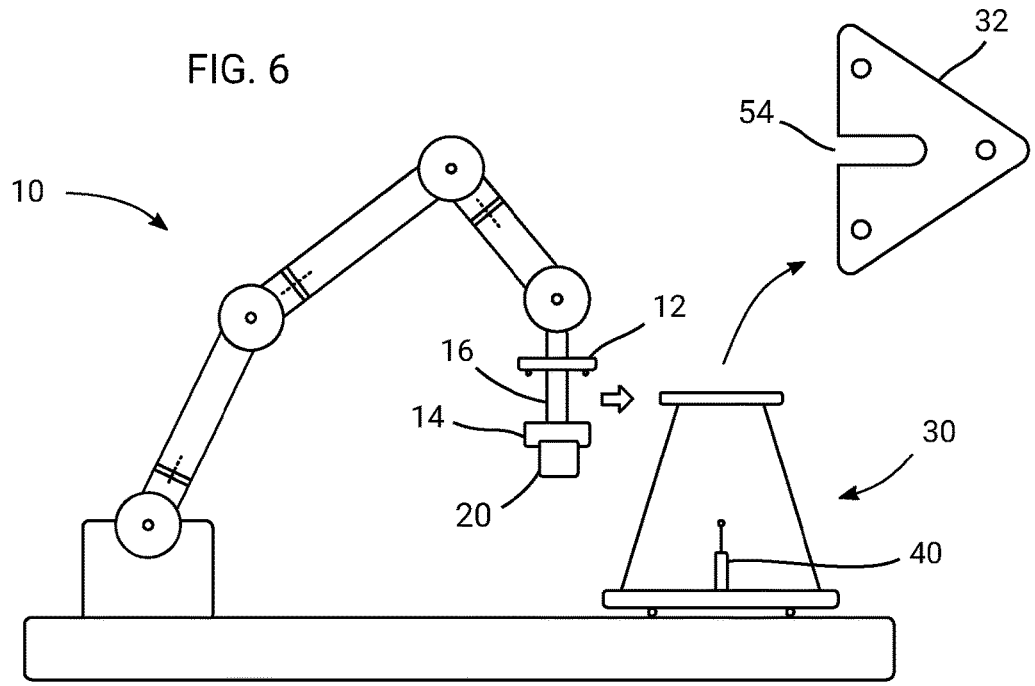
FIG. 6 illustrates a manufacturing system according to yet another embodiment of the present invention.

FIG. 6 is a schematic illustration of a manufacturing system according to another embodiment of the present invention. The manufacturing system again comprises an articulated robot 10 which is generally similar to that of the embodiment described with reference to FIG. 2. However, in the embodiment shown in FIG. 6 the gripper 14 and coupling element 12 are supported on a common member 16 that extends from the final segment of the robot 10. The structure 32 of the metrology element comprises a slot 54 into which the member 16 can be inserted, thereby allowing the robot 10 to position the coupling element 12 over the structure 32 before moving it into engagement with the structure 32. To accommodate this arrangement, the measurement probe 40 is provided in an upwardly-facing orientation on the lower structure 34 of the metrology arrangement 30, with the workpiece 20 being moved during a series of measurement operations rather than the measurement probe 40.

Figure 7:
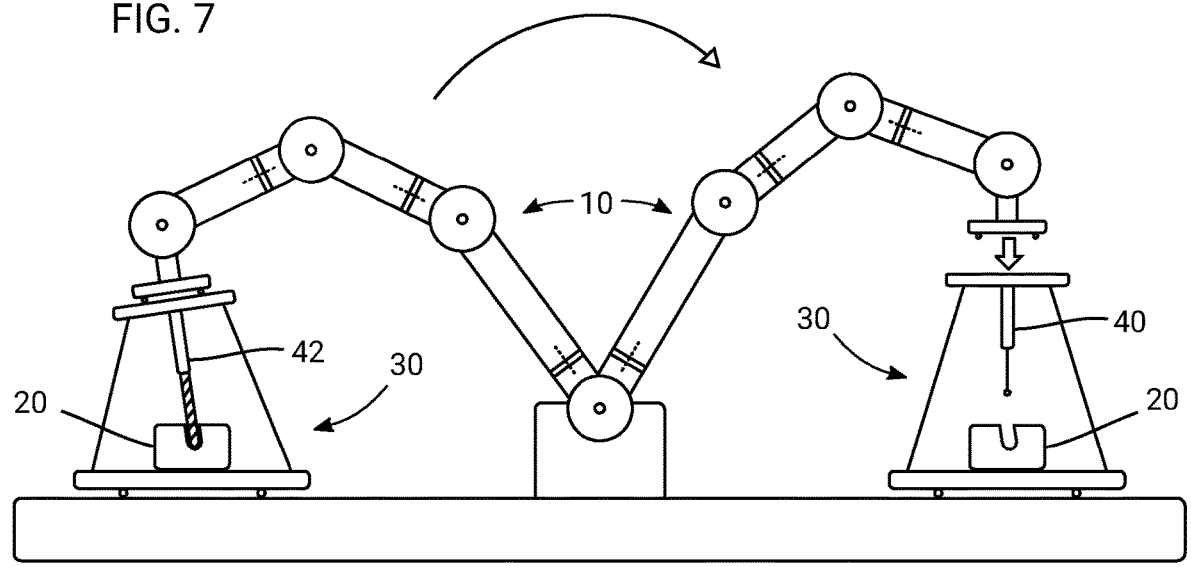
FIG. 7 illustrates a manufacturing system according to a yet further embodiment of the present invention.

Coupling of the robot 10 to a metrology arrangement 30 as described above is not only of use when a measurement operation is to be performed, as will be apparent from the manufacturing system embodying the present invention shown in FIG. 7. The embodiment of FIG. 7 also shows the use of two high-accuracy zones provided by two different metrology arrangements 30 (equivalent e.g. to zones Z1 and Z2 of FIG. 4). When coupled to the first metrology arrangement 30 (on the left-hand side of FIG. 7) a drilling operation is performed on workpiece 20 using drilling tool 42. The robot 10 then decouples from the first metrology arrangement 30 and moves over to and docks with the second metrology arrangement 30, which is provided with a measurement probe 40 for measuring the machined workpiece 20 with high accuracy. The workpiece 20 itself can be moved from one station to the other manually, or by way of a gripper on the robot 10 (not shown) in a similar way to what is described with reference to FIG. 2.

Figure 8A:
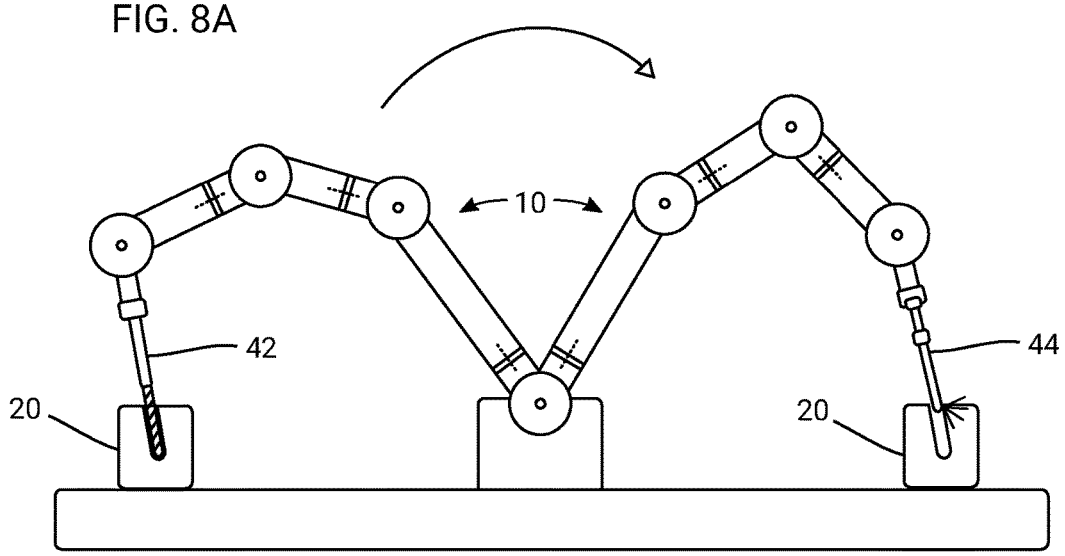
FIG. 8A shows a manufacturing system not embodying the present invention in which a drilling operation is followed by an assembly operation.

As well as providing high-accuracy zones within a manufacturing environment for measuring and drilling or machining, an embodiment of the present invention also finds application to assembly operations, as will now be described with reference to FIGS. 8A to 8C. FIG. 8A shows a manufacturing system not embodying the present invention in which a drilling operation is performed at a first station (on the left-hand side of FIG. 8A), followed by an assembly operation performed at a second station (on the right-hand side of FIG. 8A). The assembly operation involves inserting a spigot 44 into the hole drilled in the workpiece 20 in the first operation, but this is of course just an illustrative example. Because of the relatively low accuracy of the positioning arrangement of the robot 10, where very tight tolerances are involved (such as a very tight fit of the spigot 44 in the drilled hole), it is likely that the assembly operation will fail at least in some instances (as depicted in the right-hand side of FIG. 8A, where the spigot 44 does not quite fit into the hole).

Figure 8B:
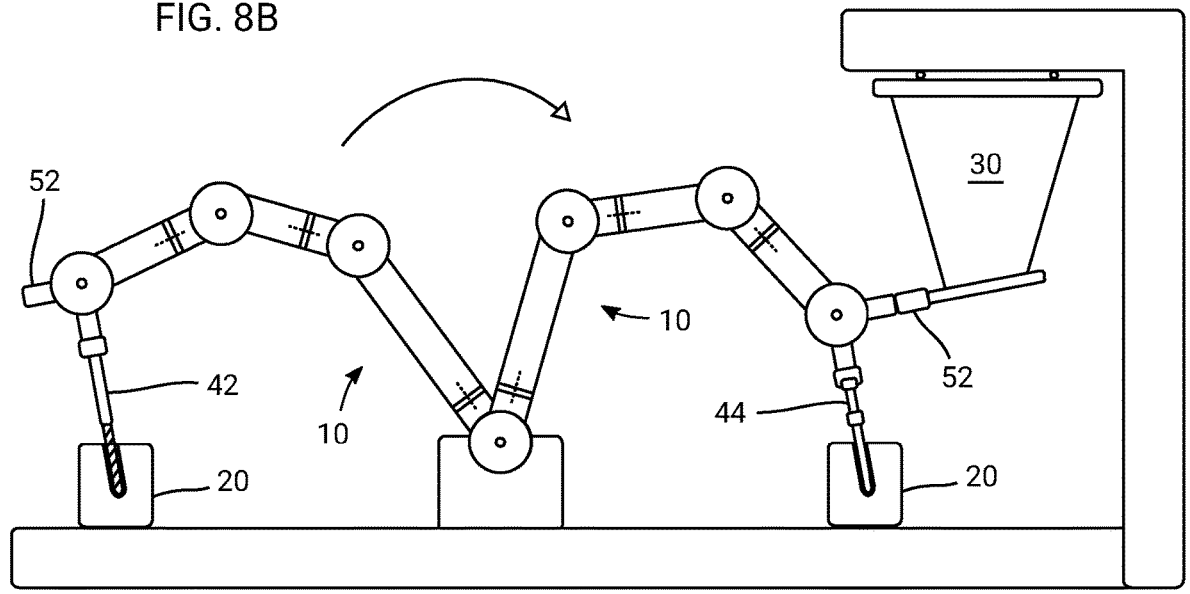

This situation is improved with a manufacturing system embodying the present invention as shown in FIG. 8B, in which a dockable metrology arrangement 30 provides a high-accuracy zone for the assembly operation, thereby enabling the spigot 44 to be inserted into the hole with a greater degree of success, and thereby improving the yield from the production process. The embodiment shown in FIG. 8C takes this a step further, by providing a high-accuracy zone for both the drilling and assembly operations.

Figure 9A:
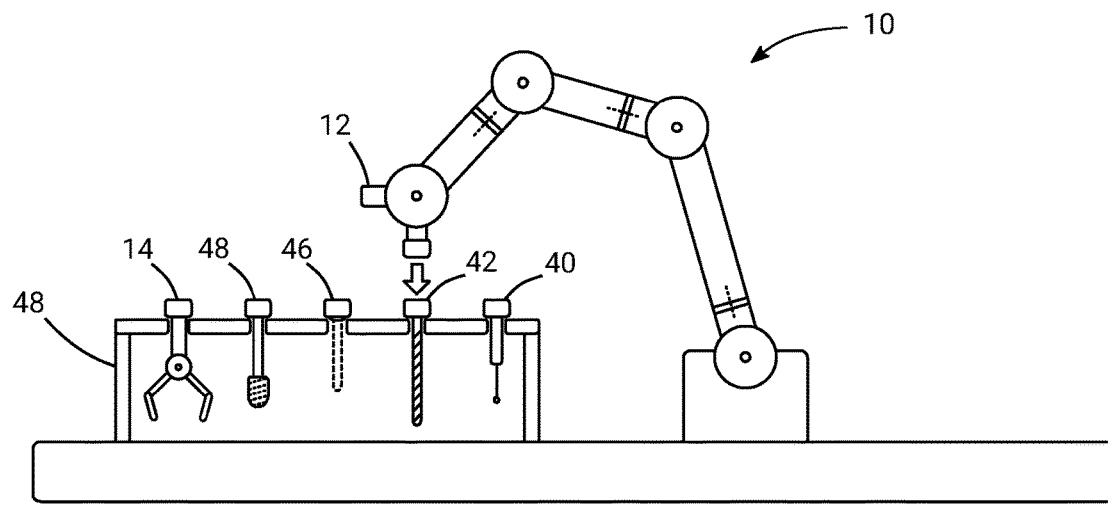
FIGS. 9A to 9D illustrate a manufacturing system and method embodying the present invention in which a tool is picked up by the robot from a rack prior to engaging with the metrology arrangement.

FIGS. 9A to 9D illustrate a manufacturing system and method according to another embodiment of the present invention. As shown in FIG. 9A, a tool rack (or tool holder) 48 is provided within the working volume of the robot 10. A variety of tools are held in the rack 48, including a gripper 14, a milling tool 48, a laser cutting tool 46, a drilling tool 42 and a measurement probe 40. A modular coupling system is used such that each of the tools can be removably coupled to the robot 10 as and when required, i.e. picked up from the rack 48 and used to perform an operation, then dropped back in the rack 48 so that another tool can be picked up, if required. The removable coupling enables this to be achieved with relative ease and without manual intervention, in an automated manner, so that it can be used in an automated manufacturing process.

Figure 9B:
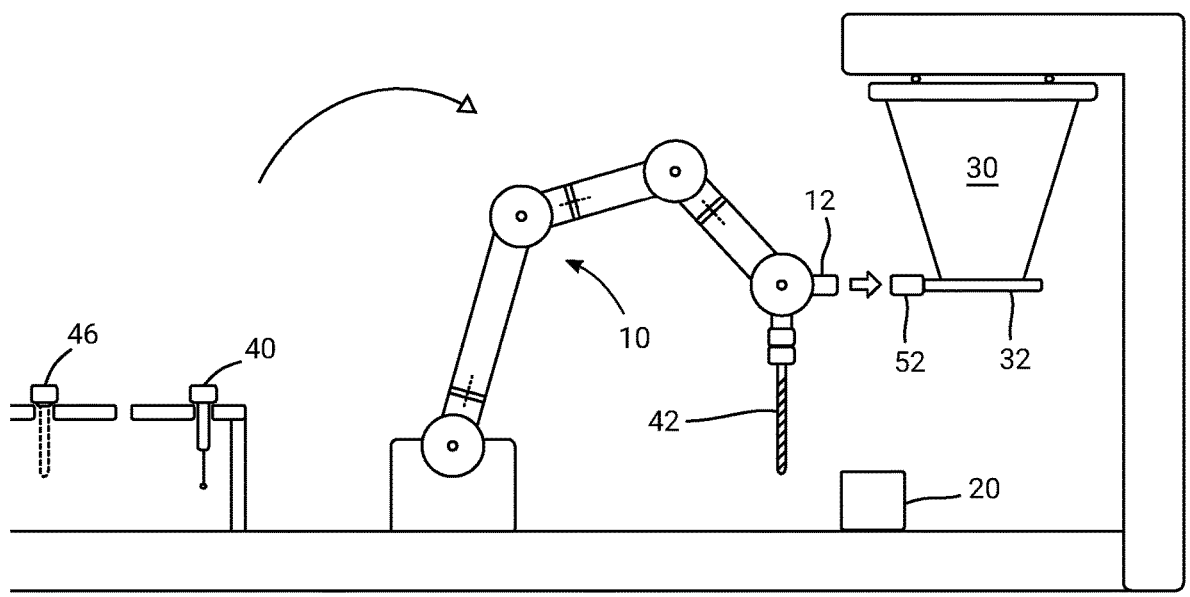
Figure 9C:
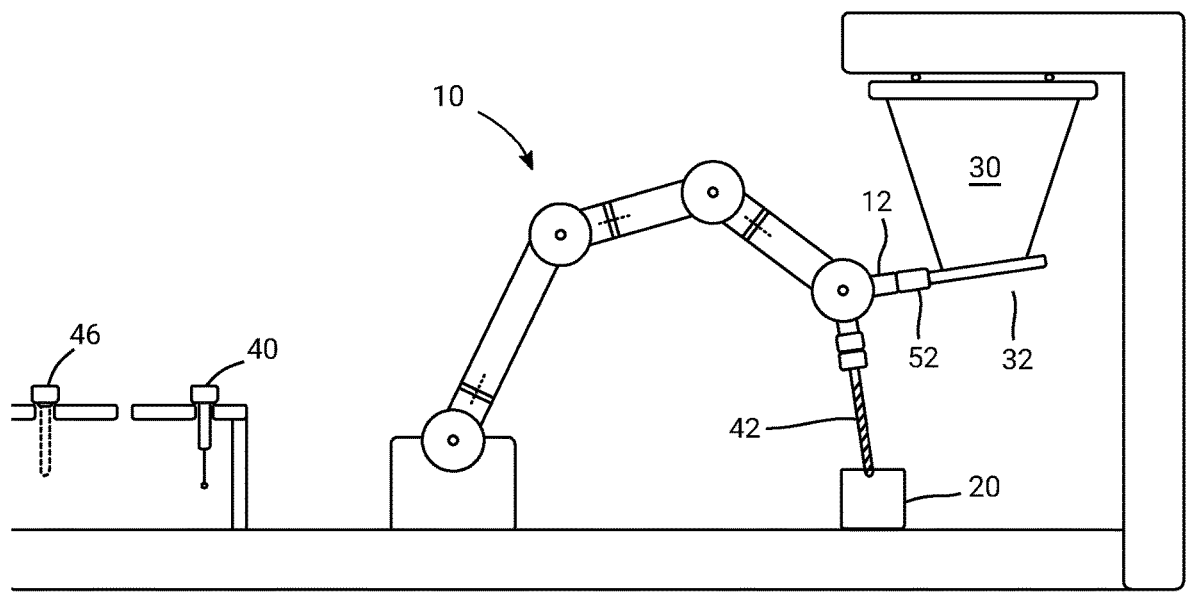
Figure 9D:
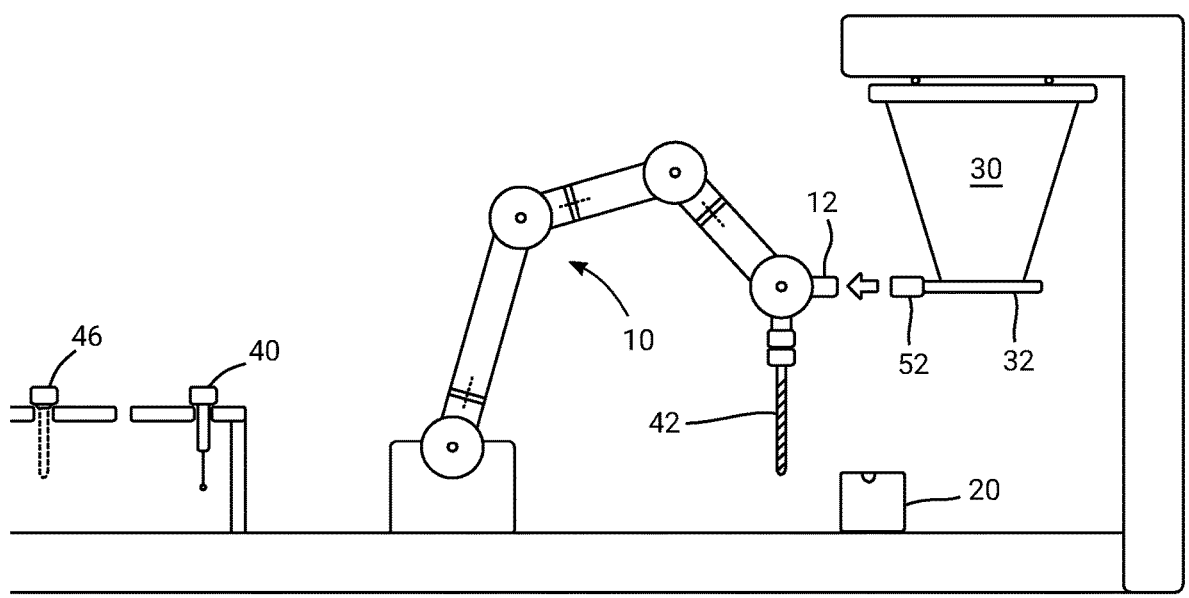

In the example shown in FIG. 9A, the robot 10 is controlled to pick up the drilling tool 42, and in FIG. 9B the robot 10 moves over to a work area (high-accuracy zone) in which a metrology arrangement 30 is provided. The robot 10 docks with the metrology arrangement 30 as described above via the coupling elements 12 and 52 provided respectively on the robot 10 and metrology arrangement 30. When so docked, and with high-accuracy metrology available from the metrology arrangement 30, a precision drilling operation is carried out on the workpiece 20 as shown in FIG. 9C. When the operation is complete, the robot 10 undocks once more from the metrology arrangement 30, back into the lower-accuracy regime, so that it may continue with other tasks, for example after having dropped the drilling tool 42 back in the rack 48.

Figure 10:
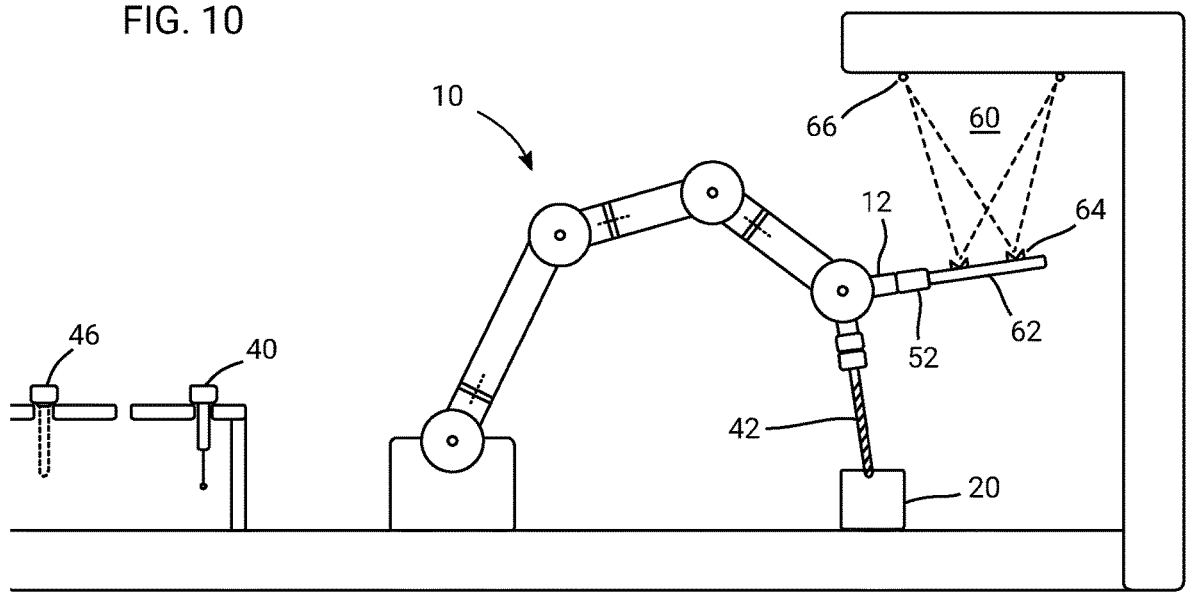
FIG. 10 illustrates an embodiment in which an optical hexapod metrology arrangement is used instead of a physical hexapod metrology arrangement.

FIG. 10 illustrates an embodiment in which the physical extendible legs 36 of the hexapod metrology arrangement of previous embodiments are effectively replaced by an optical equivalent. In other words, in this embodiment an optical hexapod metrology arrangement 60 is used instead of a physical hexapod metrology arrangement 30. A plurality of retroreflectors 64 are arranged on a support structure 62, with the support structure being coupled to the robot 10 via the coupling elements 12, 52 described previously. A plurality of light sources (e.g. lasers) 66 are arranged on the fixed structure above the support structure 62, with each light source being paired with one of the retroreflectors 64 to direct its light onto its paired retroreflector 64. These light sources 66 and retroreflectors 64 are equivalent to the ball joints 38 of FIGS. 3 and 5B, with the outgoing and reflected light beams being equivalent to the extendible legs 36. Using well known techniques, e.g. based on time of flight, the various separations can be measured so that the position of the structure 62 can be determined.

Figure 11:
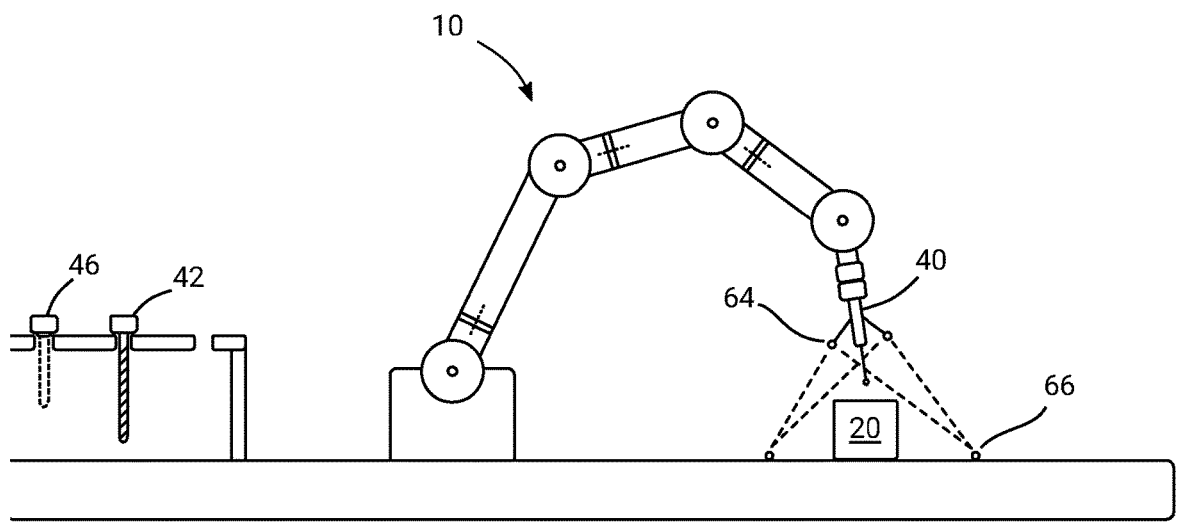
FIG. 11 illustrates an alternative type of optical metrology arrangement to that of FIG. 10.

FIG. 11 illustrates an alternative type of optical metrology arrangement in which optical targets 64 are provided on the tool itself, in this example on the measurement probe 40, with the light sources 66 interacting with the optical targets 64 in order to provide a plurality of measurements of separation, from which the position of the measurement probe 40 can be determined. Other optical or image-based (photogrammetric) metrology arrangements would be equally suitable.

Although optical and image-based metrology arrangements can be used in an embodiment of the present invention, a mechanical hexapod-based metrology arrangement 30 can be provided at a lower cost and with fewer technical complications and issues than a laser-based metrology arrangement, for example. Laser tracking systems in particular are very costly and complex to use effectively, at least partly due to the need for complicated control systems to ensure that the lasers (e.g. the lasers 66 of FIG. 10) are tracking their respective targets (e.g. the reflectors 64 of FIG. 10).

A mechanical hexapod-based metrology arrangement 30 also has advantages over some image-based metrology arrangements in terms of the rate at which the position of the moving structure 22 can be determined or sampled. For image-based (photogrammetric) metrology arrangements, the sampling rate is inherently limited by the sampling rate of the image sensor, and further limited by the time take to perform complex calculations based on the large amount of image information in order to derive the position of the moving platform. For example, with the image-based system of EP3054265A1 it is stated that "the frame rate supplied by the imaging detectors usually is only up to a few hundred hertz"; this is described as being a benefit because it avoids detecting unwanted high frequency movements, like vibrations.

However, the present applicant has appreciated that a far higher dynamic bandwidth can be achieved by direct sampling of data from measurement transducers associated with the extendable legs of a hexapod metrology arrangement. For example, a machine controller may typically request position data from an absolute encoder every 65 µs (15 kHz), but higher sampling rates are also possible. Incremental encoder systems produce a continuous sinusoidal output which allows finer motion control still, limited only by the rate at which the continuous output can be sampled. Unlike image-based systems, the calculations required to determine the position of the moveable structure from these values are not overly time consuming.

Although a hexapod metrology arrangement 30 is described above, which is capable of measuring in six degrees of freedom, the present invention is equally applicable in connection with a metrology arrangement that is not a hexapod arrangement, so that fewer than six extendable legs 36 may be used when fewer degrees of freedom need to be measured. Use of other types of metrology arrangement is also possible.

Figure 12:
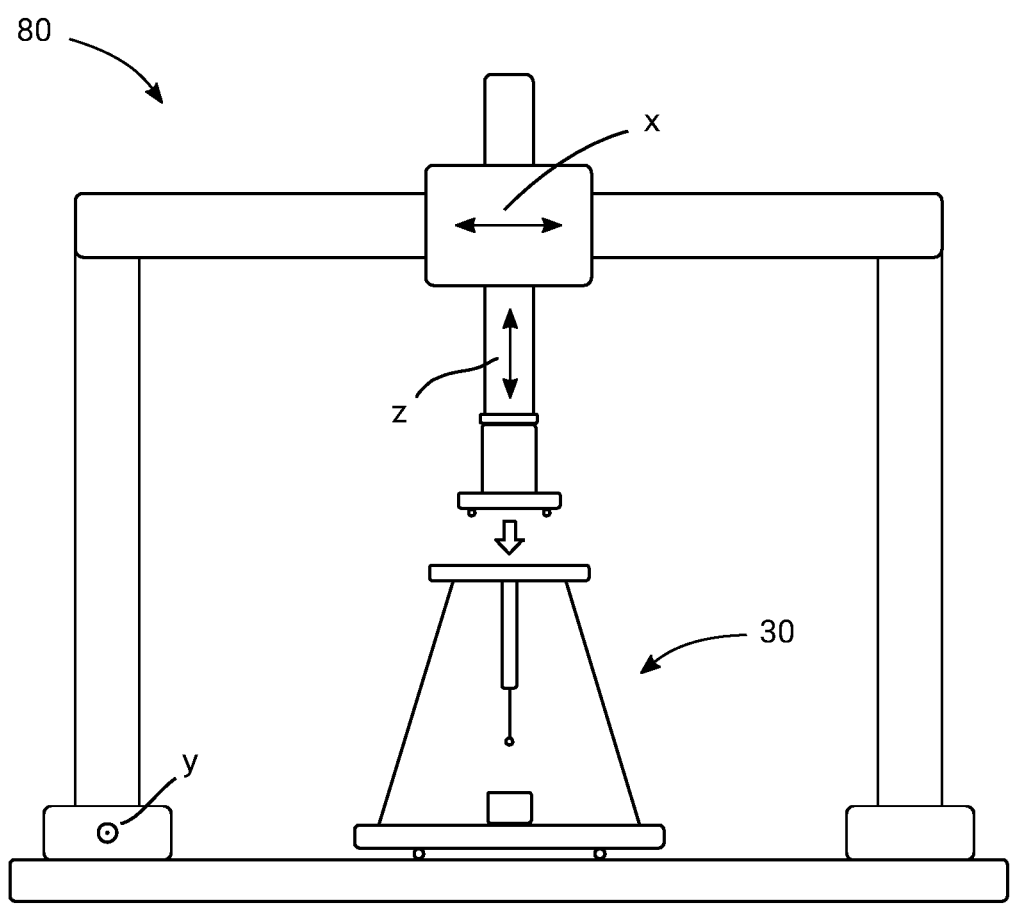
FIG. 12 illustrates an embodiment in which a serial-kinematic Cartesian coordinate positioning machine is used instead of a robot.

The present invention is also not limited to the use of a robot such as that described above as the coordinate positioning machine. For example, a serial-kinematic Cartesian coordinate positioning machine 80 such as that shown in FIG. 12 could be used, having three parts connected in series that are moveable respectively along orthogonal axes x, y and z. As with other embodiments, the machine would couple removably and temporarily with the metrology arrangement 30 to perform high-accuracy operations, and then decouple again from the metrology arrangement 30 to perform other tasks. For example, the machine could have a long y axis, with a plurality of different work areas defined along that y axis, at least one of which has a high-accuracy zone with a dockable metrology arrangement 30 as shown in FIG. 12.

The concept of zones was described above with reference to FIG. 4, with high-accuracy zones Z1 to Z3 defined within the overall working volume W of the robot 10 (or other type of coordinate positioning machine). It will be appreciated that the robot 10 is not precluded from operating within any of these zones Z1 to Z3 with its own inherent accuracy, i.e. using its own positioning arrangement to determine its position, because FIG. 2C already shows an example in which the robot 10 is not connected to the metrology arrangement 30 and yet is operating within the zone of the metrology arrangement 30.

Following from this it will also be apparent that the present invention is equally applicable to a situation in which a high-accuracy zone and a low-accuracy zone overlap in space, though not in time. By this it is meant that an embodiment is envisaged in which there is a defined working volume of the coordinate positioning machine, and for a first period of time the coordinate positioning machine uses lower-accuracy positional information from its own positioning arrangement, and then the coordinate positioning machine couples to a higher-accuracy positioning arrangement (referred to herein as a metrology arrangement), and for a second period of time following after the first period of time the coordinate positioning machine operates based on higher-accuracy positional information from the higher-accuracy positioning arrangement, within the same working volume.

Such a scheme can find use, for example, in a machine tool in which machining operations are carried out using the positioning arrangement provided as standard with the machine tool, but for a measurement or probing operation (to measure the machined workpiece) the machine tool can couple to a higher-accuracy positioning (metrology) arrangement, such as a hexapod metrology arrangement described above, measure the workpiece, and then decouple from the metrology arrangement to perform additional machining operations, all within the same space.

Figure 13:
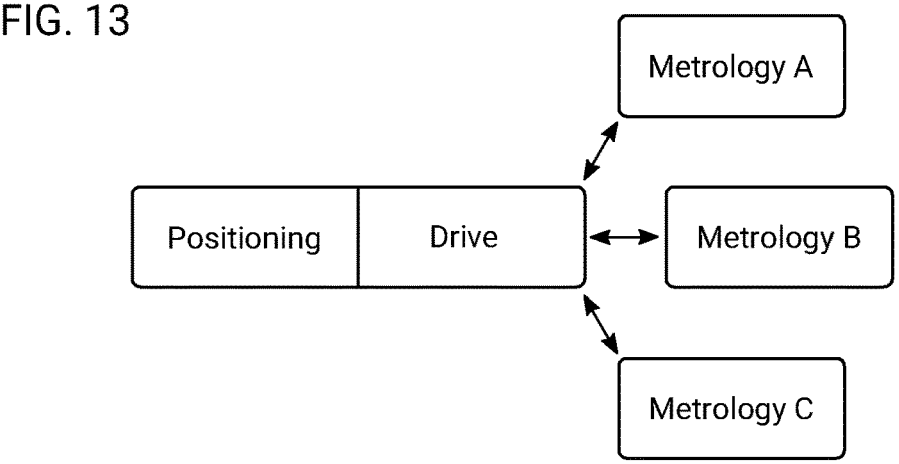
FIG. 13 is a schematic illustration of a "modular metrology" concept according to an embodiment of the present invention.

The general concept underlying an embodiment of the present invention can be summarised as shown in FIG. 13, which schematically illustrates a coordinate positioning machine having a drive arrangement for moving some structure around the working volume, and a positioning arrangement for determining the position of the structure. The coordinate positioning machine can be removably coupled to one or more metrology arrangements which are able to provide positional information that is independent from any positional information being provided by the positioning arrangement of the coordinate positioning machine itself. To be of use, the positional information from the one or more metrology arrangements will have some advantage over that from the positional information from positioning arrangement of the coordinate positioning machine. For example, it could be more accurate, as described above. Or, a specific type of metrology arrangement could be used in conjunction with a specific tool that requires a controller that itself can only be understand data from that specific type of metrology arrangement rather than from the positioning arrangement that comes as standard with the coordinate positioning machine.

Figure 14:
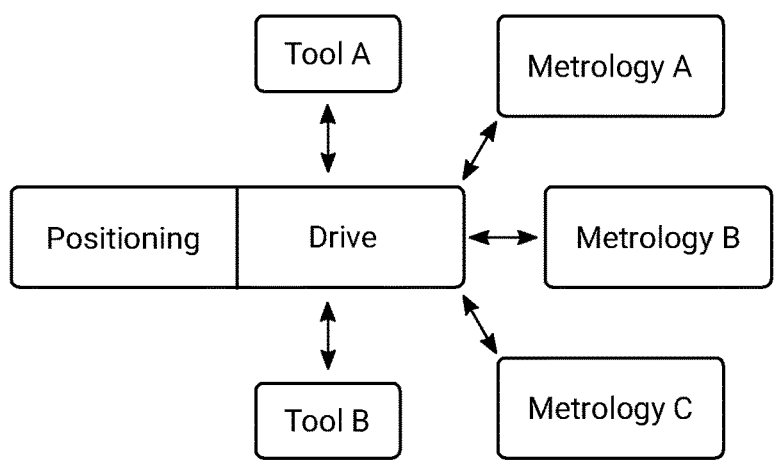
FIG. 14 shows an extension to the "modular metrology" concept of FIG. 13, introducing a "modular tool" concept in addition to the "modular metrology" concept.
Figure 15:
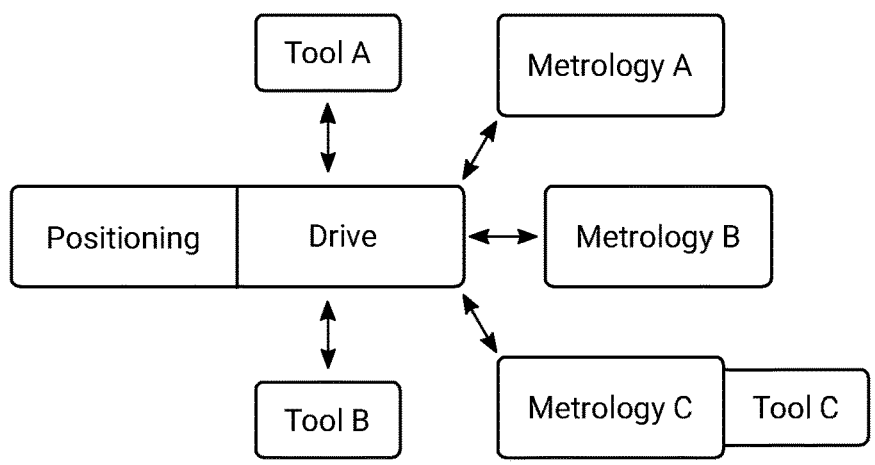
FIG. 15 introduces a "smart tool" concept to that shown in FIG. 14, in which at least one of the metrology arrangements is provided with an integral tool (or the tool is provided with an integral metrology arrangement).

The modular concept can be extended as shown in FIG. 14. In addition to being able to couple the coordinate positioning machine removably to any one of one or more metrology arrangements, the coordinate positioning machine can also be removably coupled to any one of one or more tools; for example, such a concept is used in the embodiment shown in FIG. 9. Furthermore, as illustrated schematically in FIG. 15, a metrology arrangement can be provided with its own tool (see Metrology C/Tool C of FIG. 15) in which case the metrology arrangement effectively acts like a "smart tool", i.e. a tool with its own dedicated metrology arrangement; for example, such a concept is used in the embodiment of FIG. 2. Or the coordinate positioning machine can pick up and use a separate tool and couple to a metrology arrangement separately, in which case the metrology arrangement is used purely for the metrology; such a concept is used for example in the embodiment of FIG. 9.

The positioning arrangement (rotary encoders) of the robot 10 described above enable the position of the tool to be determined explicitly. This provides a closed-loop servo control system where the motors in the robot 10 are commanded to drive the various rotary joints 6 by a particular amount in a particular direction in order to move the robot 10 into or towards a new pose, with measurements from the encoders being used to determine the actual position so that subsequent commands can be adjusted accordingly.

It is also possible to use a coordinate positioning machine in an embodiment of the present invention that instead has an open-loop control system, for example using stepper motors, where each stepper motor is commanded to move a certain number of steps, and with the distance or angle moved with each step being calibrated and thereby enabling an assumed position to be determined based on the number of steps moved by each stepper motor. As such, the actual position of the machine is not measured as such, but is instead inferred from the stepper counter and from the machine geometry.

The term 'positioning arrangement' as used herein is intended to cover both of the above types of arrangement, i.e. an arrangement which is used to determine the position of the machine, whether directly based on measurements from a set of measurement transducers or indirectly based on e.g. counting steps.

A machine controller for controlling the operation of the robot (or other type of coordinate positioning machine) is also provided. The machine controller may be a dedicated electronic control system and/or may comprise a computer operating under control of a computer program. For example, the machine controller may comprise a real-time controller to provide low-level instructions to the coordinate positioning machine, and a PC to operate the real-time controller.

It will be appreciated that operation of the coordinate positioning machine can be controlled by a program operating on the machine, and in particular by a program operating on a coordinate positioning machine controller such as the controller illustrated schematically in FIG. 1. Such a program can be stored on a computer-readable medium, or could, for example, be embodied in a signal such as a downloadable data signal provided from an Internet web site. The appended claims are to be interpreted as covering a program by itself, or as a record on a carrier, or as a signal, or in any other form.

The invention claimed is:

1. A manufacturing system for performing a manufacturing method, the system comprising:
   a coordinate positioning machine having a structure moveable within a working volume of the machine, a drive arrangement for moving the structure around the working volume, and a positioning arrangement for determining a position of the structure within the working volume during a first operation of the manufacturing method with a first accuracy; and
   a metrology arrangement to which the machine is removably couplable for a second operation of the manufacturing method, such that when the machine is coupled to the metrology arrangement for the second operation, with the structure being moved by the drive arrangement, the metrology arrangement is able to measure the position of the structure during the second operation with a second accuracy that is higher than the first accuracy, wherein the machine is controlled during the second operation based on positional data from the metrology arrangement.

2. The manufacturing system as claimed in claim 1, wherein when the machine is coupled to the metrology arrangement a predetermined zone is defined within the working volume in which the metrology arrangement is able to measure the position of the structure with the second accuracy.

3. The manufacturing system as claimed in claim 2, comprising a plurality of metrology arrangements around the working volume, defining a plurality of corresponding respective zones within the working volume.

4. The manufacturing system as claimed in claim 1, wherein the drive arrangement comprises a plurality of segments connected in series by motorised joints.

5. The manufacturing system as claimed in claim 1, wherein the machine is a robot arm.

6. The manufacturing system as claimed in claim 1, wherein the positioning arrangement comprises a plurality of measurement transducers in a serial arrangement for providing a corresponding respective plurality of measurements from which the position of the structure is determinable with the first accuracy.

7. The manufacturing system as claimed in claim 1, wherein the metrology arrangement comprises a plurality of measurement transducers in a parallel arrangement for providing a corresponding respective plurality of measurements from which the position of the structure is determinable with the second accuracy.

8. The manufacturing system as claimed in claim 7, wherein the metrology arrangement comprises six such measurement transducers.

9. The manufacturing system as claimed in claim 1, wherein the metrology arrangement is a hexapod metrology arrangement and/or the metrology arrangement is a passive metrology arrangement; and/or the metrology arrangement is able to measure the position of the structure in six degrees of freedom.

10. The manufacturing system as claimed in claim 1, wherein the machine is a robot arm and/or is operable to perform at least one of the following types of operation with the machine also coupled to the metrology arrangement: a measurement operation, a probing operation, a machining operation, a gripping operation, a drilling operation, a painting operation, a pick and place operation, and a gluing operation.

11. The manufacturing system as claimed in claim 1, wherein the machine is couplable to at least one tool with the machine also coupled to the metrology arrangement.

12. The manufacturing system as claimed in claim 11, wherein the machine comprises a coupling which enables it to be coupled to the at least one tool and to the metrology arrangement at the same time.

13. The manufacturing system as claimed in claim 11, wherein the machine is coupled to the at least one tool.

14. The manufacturing system as claimed in claim 11, wherein the at least one tool comprises at least one of a measurement probe, a gripper, a drilling tool, a welding tool, a gluing tool, and a painting tool.

15. The manufacturing system as claimed in claim 11, wherein the at least one tool is provided as an integral part of the metrology arrangement.

16. The manufacturing system as claimed in claim 1, wherein the metrology arrangement is not coupled to the machine only for calibrating the machine in advance of the machine being put into operational use.

17. The manufacturing system as claimed in claim 16, wherein the metrology arrangement becomes part of the machine during operational use of the machine.

18. The manufacturing system as claimed in claim 1, wherein the coupling is a physical coupling and/or a mechanical coupling and/or an automated coupling.

19. The manufacturing system as claimed in claim 1, wherein the coupling between the machine and the metrology arrangement is a kinematic or pseudo-kinematic coupling.

20. The manufacturing system according to claim 1, further comprising:
a machine controller operable to perform a method comprising:
performing the first operation with the machine uncoupled from the metrology arrangement;
determining the position of the structure during the first operation using the positioning arrangement of the machine;
coupling the machine to the metrology arrangement;
performing the second operation with the machine coupled to the metrology arrangement;
measuring the position of the structure during the second operation using the metrology arrangement; and
decoupling the machine from the metrology arrangement.

21. A method of controlling the manufacturing system as claimed in claim 1, comprising:
performing the first operation with the machine uncoupled from the metrology arrangement;
determining the position of the structure during the first operation using the positioning arrangement of the machine;
coupling the machine to the metrology arrangement;
performing the second operation with the machine coupled to the metrology arrangement;
measuring the position of the structure during the second operation using the metrology arrangement; and
decoupling the machine from the metrology arrangement.

22. The method as claimed in claim 21, wherein when the machine is coupled to the metrology arrangement a predetermined zone is defined within the working volume in which the metrology arrangement is able to measure the position of the structure with the second accuracy, and the first operation is performed outside the zone and the second operation is performed inside the zone.

23. The method as claimed in claim 22, wherein the first operation comprises moving the machine from another such zone.

24. The method as claimed in claim 21, wherein the second operation comprises at least one of: a measurement operation, a probing operation, a machining operation, a drilling operation and a gluing operation.

25. The method as claimed in claim 21, comprising removably coupling the machine to a tool required for the second operation.

26. A computer-readable medium having stored therein computer program instructions for controlling a manufacturing system controller to perform the method as claimed in claim 21.

27. The method as claimed in claim 21, comprising removably coupling the machine to a tool required for the second operation prior to coupling to the metrology arrangement.

* * * * *